(12) United States Patent
Lee

(10) Patent No.: US 8,570,671 B2
(45) Date of Patent: Oct. 29, 2013

(54) SINGLE FOCUS LENS SYSTEM AND PHOTOGRAPHING APPARATUS INCLUDING THE SAME

(75) Inventor: Tae-kun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/556,444

(22) Filed: Jul. 24, 2012

(65) Prior Publication Data

US 2013/0057972 A1   Mar. 7, 2013

(30) Foreign Application Priority Data

Sep. 2, 2011 (KR) .................. 10-2011-0089254

(51) Int. Cl.
*G02B 13/04* (2006.01)
(52) U.S. Cl.
USPC .......................................... 359/753; 359/752
(58) Field of Classification Search
USPC ................. 359/749, 750, 751, 752, 753
See application file for complete search history.

(56) References Cited

U.S. PATENT DOCUMENTS

| | | | |
|---|---|---|---|
| 3,997,247 A * | 12/1976 | Glatzel et al. ............ | 359/754 |
| 4,111,558 A * | 9/1978 | Ikemori ................ | 359/708 |
| 5,559,638 A | 9/1996 | Aoki et al. | |
| 2007/0201140 A1 | 8/2007 | Kato | |
| 2010/0033847 A1 | 2/2010 | Kanazashi | |

FOREIGN PATENT DOCUMENTS

| | | |
|---|---|---|
| JP | 07-043606 A | 2/1995 |
| JP | 07-077651 A | 3/1995 |
| JP | 2007-225959 A | 9/2007 |
| JP | 2007-225960 A | 9/2007 |
| JP | 2007-225963 A | 9/2007 |
| JP | 2008-040033 A | 2/2008 |
| JP | 2010-044168 A | 2/2010 |

* cited by examiner

*Primary Examiner* — Scott J Sugarman

(74) *Attorney, Agent, or Firm* — Drinker Biddle & Reath LLP

(57) ABSTRACT

A single focus lens system and a photographing apparatus including the single focus lens system are disclosed. A single focus lens system is provided that includes a first lens group having a negative refractive power, a stop, and a second lens group having a positive refractive power, sequentially arranged in order from an object side, wherein the first lens group comprises first and second air lenses having a negative refractive power, a meniscus shape and a convex surface toward the object side, and the second lens group comprises a lens that has a positive refractive power, is disposed closest to the object side, and has a convex surface toward the object side.

21 Claims, 25 Drawing Sheets

SINGLE FOCUS LENS SYSTEM AND PHOTOGRAPHING APPARATUS INCLUDING THE SAME

CROSS-REFERENCE TO RELATED PATENT APPLICATION

This application claims the priority benefit of Korean Patent Application No. 10-2011-0089254, filed on Sep. 2, 2011, in the Korean Intellectual Property Office, which is incorporated herein in its entirety by reference.

BACKGROUND

1. Field of the Invention

The invention relates to a single focus lens system and a photographing apparatus including the single focus lens system.

2. Description of the Related Art

Recently, the use of digital cameras and video cameras including a solid state pickup device such as a charge coupled device (CCD) or a complementary metal-oxide semiconductor (CMOS) has considerably increased. In particular, demand for lens interchangeable single reflex cameras is increasing, and common single reflex cameras have been distributed. Digital cameras including an image pickup device such as a CCD or a CMOS, or imaging optical devices such as cameras for use in mobile phones should be manufactured at low cost, have small sizes, and be lightweight.

In addition, as demand for such cameras increases, demand for single focus lenses such as telephoto lenses or wide angle lenses is also increasing. A suggested wide angle lens is a retro-focus type (inverted telephoto type) lens structure including a first lens group having a long back focal length and having a negative refractive power, and a second lens group having a positive refractive power, sequentially arranged in order from an object side.

By using the retro-focus type lens system, a long back focal length and a wide viewing angle may be provided. However, users demand, in addition to high optical performance, a compact lens system, but it is difficult to reduce the size of the retro-focus type lens system.

SUMMARY

The invention provides a single focus lens system having a long back focal length and a compact size.

The invention also provides a single focus lens system having a large-aperture, a small F-number, and a long back focal length.

The invention also provides a photographing apparatus including a single focus lens system having a long back focal length and a compact size.

According to an aspect of the invention, there is provided a single focus lens system comprising a first lens group having a negative refractive power, a stop, and a second lens group having a positive refractive power, sequentially arranged in order from an object side, wherein the first lens group comprises first and second air lenses having a negative refractive power, a meniscus shape and a convex surface toward the object side, and the second lens group comprises a lens that has a positive refractive power, is disposed closest to the object side, and has a convex surface toward the object side, wherein the single focus lens system satisfies the following expressions, $$-10 < Fair1/F < -2.5$$

$$6 < Fair2/F < -1$$

$$0.6 < Fp2/F < 1.5,$$

where F denotes an overall focal length, Fair1 denotes a focal length of the first air lens of the first lens group, Fair2 denotes a focal length of the second air lens of the first lens group, and Fp2 denotes a focal length of the lens of the second lens group.

The first lens group may comprise at least one first lens having a negative refractive power, wherein the at least one first lens satisfies the following expressions, $$Ndn1 < 1.65$$

$$Vdn1 > 55,$$

where Ndn1 denotes a refractive index of the at least one first lens, and Vdn1 denotes an Abbe number of the at least one first lens.

The first lens group may comprise a second lens having a positive refractive power, wherein the second lens satisfies the following expression, $$Ndp1 < 1.75,$$

where Ndp1 denotes a refractive index of the second lens.

The single focus lens system may satisfy the following expression, $$0.4 < Fp1/F < 2.0,$$

wherein F denotes an overall focal length of the single focus lens system, and Fp1 denotes a focal length of the second lens.

The first and second air lenses of the first lens group may comprise at least one aspherical surface and satisfy the following expression, $$1.5 < Haph*F/ID < 4.0,$$

wherein Haph denotes a distance from a point where a ray passing through a center of an aperture among light fluxes, which are formed as an image at the highest image height of a diagonal line of an image plane, meets the aspherical surface to an optical axis, F denotes an overall focal length, and ID denotes a diagonal length of the image plane.

The first lens group may satisfy the following expressions, $$-0.5 < (R1air1 - R2air1)/(R1air1 + R2air1) < -0.1$$

$$-1.0 < (R1air2 - R2air2)/(R1air2 + R2air2) < -0.3,$$

where R1air1 denotes a curvature radius of the first air lens at the object side, R2air1 denotes a curvature radius of the first air lens at an image side, R1air2 denotes a curvature radius of the second air lens at the object side, and R2air2 denotes a curvature radius of the second air lens at the image side.

The single focus lens system may satisfy the following expressions, $$-8.0 < F1/F < -1.0$$

$$0.8 < F2/F < 1.4,$$

wherein F denotes an overall focal length of the single focus lens system, F1 denotes a focal length of the first lens group, and F2 denotes a focal length of the second lens group.

The second lens group may further comprise a third lens having a negative refractive power and a fourth lens having a positive refractive power, arranged in order from the lens that is closest to the object side toward an image side.

The fourth lens may have a convex, aspherical surface toward the image side.

The lens of the second lens group that is closest to the object side may have an aspherical surface.

The second lens group may comprise a positive-negative doublet lens or a negative-positive doublet lens disposed closest to an image side.

The first lens group and the second lens group may move in parallel along an optical axis to perform focusing.

The first lens group and the second lens group may move in parallel with respect to an optical axis with different loci to perform focusing.

The lens of the second lens group closest to the object side may perform focusing.

A half-viewing angle of the single focus lens system may be in a range from 40 to 45 degrees.

An F-number of the single focus lens system may be in a range from 2 to 2.8.

According to another aspect of the invention, there is provided a photographing apparatus comprising: a single focus lens system; and an imaging device receiving an image formed by the single focus lens system, wherein the single focus lens system comprises a first lens group having a negative refractive power, a stop, and a second lens group having a positive refractive power, sequentially arranged in order from an object side, wherein the first lens group comprises first and second air lenses having a negative refractive power, a meniscus shape and a convex surface toward the object side, and the second lens group comprises a lens that has a positive refractive power, is disposed closest to the object side, and has a convex surface toward the object side, wherein the single focus lens system satisfies the following expression, $$-10 < Fair1/F < -2.5$$

$$-6 < Fair2/F < -1$$

$$0.6 < Fp2/F < 1.5,$$

where F denotes an overall focal length, Fair1 denotes a focal length of the first air lens of the first lens group, Fair2 denotes a focal length of the second air lens of the first lens group, and Fp2 denotes a focal length of the lens of the second lens group.

BRIEF DESCRIPTION OF THE DRAWINGS

The above and other features and advantages of the invention will become more apparent upon review of detail exemplary embodiments thereof with reference to the attached drawings, in which.

DETAILED DESCRIPTION

Figure 1:
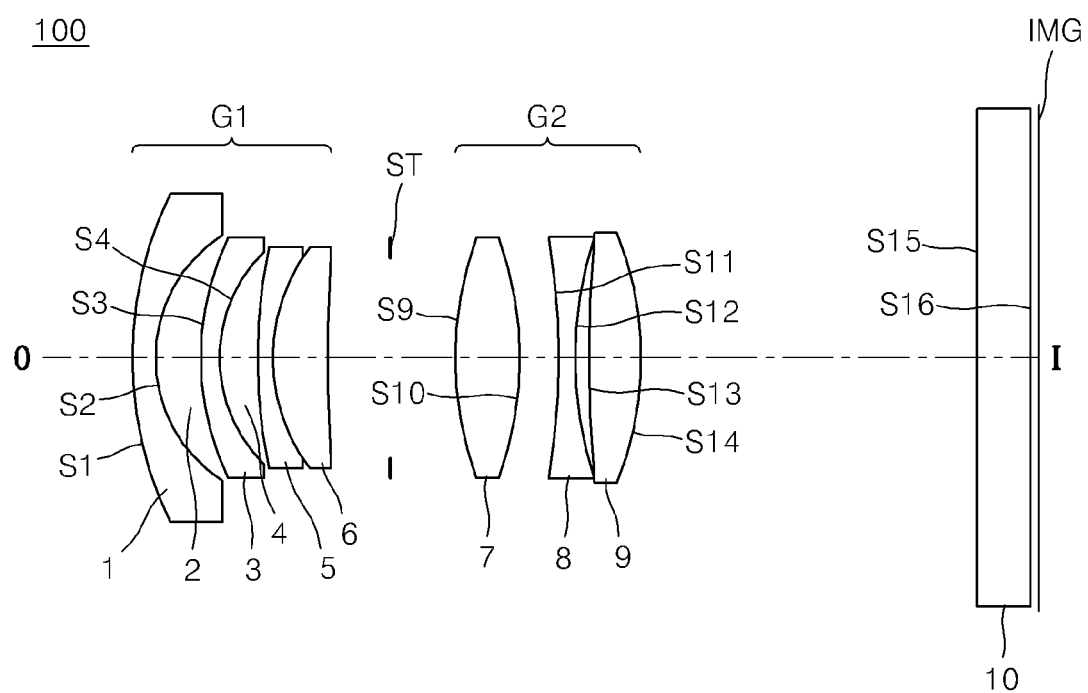
FIG. 1 illustrates a single focus lens system, according to an embodiment of the invention.

The invention will now be described more fully with reference to the accompanying drawings, in which exemplary embodiments of the invention are shown. In the drawings, like reference numerals in the drawings denote like elements, and the size or thicknesses of elements may be exaggerated for convenience of description. Because like reference numerals in the drawings denote like elements, duplicative descriptions will be omitted. The embodiments described below are exemplary, and various changes may be made based on the embodiments.

Expressions such as "at least one of," when preceding a list of elements, modify the entire list of elements and do not modify the individual elements of the list.

FIG. 1 illustrates a single focus lens system 100, according to an embodiment of the invention. The single focus lens system 100 includes a first lens group G1 having a negative refractive power, a stop ST, and a second lens group G2 having a positive refractive power arranged in this order from an object side O.

The first lens group G1 may include at least two meniscus type air lenses having a negative refractive power and a convex surface toward the object side O. For example, the at least two air lenses may comprise a first air lens 2 and a second air lens 4. An air lens refers to a lens configured by an air gap between neighboring lenses to have optical refractive power. At least one of the first and second air lenses 2 and 4 may have an aspherical surface that is convex toward the object side O. As an air lens having a meniscus shape and a convex shape toward the object side O is formed, a difference between an incident angle and an exit angle for peripheral light flux on an optical surface is reduced, and thus astigmatic field curvature, astigmatism, and peripheral coma aberration may be corrected.

The first lens group G1 may include, for example, at least one lens having a negative refractive power. Also, the first lens group G1 may include a lens having a positive refractive power. For example, the first lens group G1 may include a first lens 1 having a negative refractive power, a second lens 3 having a negative refractive power, a third lens 5 having a positive refractive power, and a fourth lens 6 having a negative refractive power. Alternatively, the first lens group G1 may include a first lens 1 having a negative refractive power, a second lens 3 having a negative refractive power, a third lens 5 having a negative refractive power, and a fourth lens 6 having a positive refractive power.

At least one of the first lens 1 and the second lens 3 may be formed of a crown glass material, and the one having a positive refractive power from among the third lens 5 and the fourth lens 6 may be formed of a flint glass material.

The second lens group G2 may have a fifth lens 7 that is closest to the object side O, has a convex surface toward the object side O, and has a positive refractive power. The fifth lens 7 may collect peripheral light flux and central light flux, and control a focal length, a back focus, exit pupil characteristics, etc.

The second lens group G2 may further include a sixth lens 8 having a negative refractive power and a seventh lens 9 having a positive refractive power, arranged at an image side I of the fifth lens 7. The second lens group G2 may include at least one aspherical surface according to an F-number and target performance of a lens system.

The single focus lens system 100, according to the current embodiment of the invention, may be used in imaging optical systems such as digital still cameras and digital video cameras. A single focus lens system may have a half-viewing angle in the range of 40 to 45 degrees and an F-number of from 2 to 2.8. Accordingly, a single focus lens system having a wide viewing angle and a relatively large aperture, with a high resolution up to a peripheral image plane and a compact size may be obtained.

As still cameras or video cameras are based on digital image processing, distortion may be corrected by computer. Thus, a high resolution power may be realized despite a compact size.

The single focus lens system 100, according to the current embodiment, includes a small number of lenses to obtain a compact size, and a flange back appropriate for lens exchange may be achieved and the overall length thereof may be reduced through power arrangement of the first lens group G1 and the second lens group G2. Also, the lens system 100 having a compact size may be manufactured by reducing distances between lenses of the first lens group G1 having a negative power and including at least two meniscus type air lenses having a convex surface toward an object side O and a negative refractive power. By selecting appropriate material of the lenses of the first lens group G1 and through power arrangement of the lenses, a refraction angle at an optical surface of a peripheral ray having a half-viewing angle of 40 degrees or more may be reduced; magnification chromatic aberration may be effectively corrected; and a Petzval sum may be reduced. Also, as at least one of the first air lens 2, 4 and the second lens 3 includes a convex, aspherical surface toward the object side, distortion and astigmatic field curvature may be corrected. An effective aperture of the aspherical surface may be reduced so as to increase correction power of the aspherical surface and to manufacture the aspherical surface at low costs.

As the second lens group G2 includes three lenses, any remaining aberration may be corrected and a large aperture having an F-number that is less than 2.8 may be achieved. The second lens group G2 may further correct any remaining astigmatic field curvature, astigmatism, spherical aberration, and coma that have not been fully corrected by the first lens group G1. Also, as the second lens group G2 includes at least one aspherical surface, sagittal coma and spherical aberration due to the large aperture may be effectively corrected, and astigmatic field curvature and aspherical aberration may be balanced. For example, to correct the remaining spherical aberration, an aspherical surface may be formed on a lens of the second lens group G2 that is closest to the object side O. Alternatively, to correct astigmatic field curvature and astigmatism, an aspherical lens may be formed on a lens of the second lens group G2 closest to an image side I. For example, to correct aberration in order to obtain a large aperture and a wide angle, an aspherical surface may be formed in the second lens group G2 to be closest to the image side I. Alternatively, an aspherical lens may be formed in the second lens group G2 to be the closest to the object side O with a relatively small effective aperture so as to reduce the manufacturing costs of the lens.

Meanwhile, according to the embodiments of the invention, for example, the first lens group G1 and the second lens group G2 may be moved in parallel along an optical axis to perform focusing. When focusing is conducted this way, a simple focusing instrument may be used, thereby obtaining a compact lens system.

Alternatively, focusing may be conducted by moving the first lens group G1 and the second lens group G2 along different tracks. When focusing is conducted this way, astigmatic field curvature may be effectively corrected up to a near distance of a magnification of 0.2 or greater.

Alternatively, an inner focusing method in which focusing is conducted by moving a lens closest to the object side O of the second lens group G2 along the optical axis may also be used. Meanwhile, a plurality of focusing lenses may be included in the second lens group G2. For example, the fifth lens 7 of the second lens group G2 may perform focusing. Here, the fifth lens 7 is formed of one lens, but may also be formed of several lenses.

Meanwhile, the single focus lens system 100 may satisfy the following inequalities.

$$-10 < Fair1/F < -2.5 \quad \text{[Inequality 1]}$$

$$-6 < Fair2/F < -1 \quad \text{[Inequality 2]}$$

$$0.6 < Fp2/F < 1.5 \quad \text{[Inequality 3]}$$

Here, F denotes the overall focal length, Fair1 denotes a focal length of the first air lens 2 of the first lens group G1, Fair2 denotes a focal length of the second air lens 4 of the first lens group G1, and Fp2 denotes a focal length of the first lens 7 of the second lens group G2 from the object side O.

Inequality 1 defines refractive power of the first air lens 2 of the first lens group G1 from the object side O. If the refractive power of the first air lens 2 is large so that (Fair1/F) is greater than the upper limit, it is difficult to correct astigmatic field aberration, astigmatism, and coma of a peripheral portion of an image plane. If (Fair1/F) is less than the lower limit, it is difficult to reduce the overall length, and thus, to obtain a compact size. By satisfying Inequality 1, a wide angle lens system having a half-viewing angle of 40 degrees or more and being capable of maintaining high optical performance up to the peripheral portion of the image plane may be manufactured while reducing the overall length of the lens system. The second air lens 4 may correct not only astigmatic field curvature, astigmatism, and coma aberration still remaining after correction in the first air lens 2 but may also correct spherical aberration and sagittal coma aberration due to the large aperture.

Inequality 2 defines refractive power of the second air lens 4 of the first lens group G1; if (Fair2/F) is greater than the upper limit of Inequality 2, it is difficult to correct aberration, and if (Fair2/F) is less than the lower limit, it is difficult to reduce the overall length.

In Inequality 3, if (Fp2/F) is greater than the upper limit, a back focal length is increased, and an optical overall length of the lens system 100 is increased. Also, an effective aperture of lenses of the second lens group G2 toward the image side I is increased, and refractive power may be increased. Accordingly, it is difficult to correct astigmatism and astigmatic field curvature. If (Fp2/F) is less than the lower limit of Inequality 3, refractive power of the first lens 7 of the second lens group G2 greatly increases, and this makes it difficult to correct spherical aberration and increases sensitivity so that manufacture of the lens is difficult. By satisfying Inequalities 1, 2, and 3, an appropriate back focal length may be maintained, and a compact wide angle lens system may be implemented. Also, through power arrangement, aberration correction, and aberration balancing, a large aperture lens system may be implemented.

Meanwhile, a focal length (E.F.L.) of an air lens according to an embodiment of the invention may be calculated using the following equation.

$$E.F.L = \frac{1}{\frac{n_2-n_1}{n_3R_1}+\frac{n_3-n_2}{n_3R_2}-\frac{(n_2-n_1)(n_3-n_2)}{n_2n_3R_1R_2}D} \quad \text{[Equation 4]}$$

Here, an air lens may be defined by an air gap between two neighboring lenses, and n1 denotes a refractive index of a lens at the object side O of the air gap, n2 denotes a refractive index of the air, n3 denotes a refractive index of a lens at the image side I of the air gap, D denotes the air gap, R1 denotes a curvature radius of the air lens at the object side O, and R2 denotes a curvature radius of the air lens at the image side I.

As n2, the refractive index of the air, is 1, Equation 4 may be rearranged as below.

$$E.F.L = \frac{1}{\frac{1-n_1}{n_3R_1}+\frac{n_3-1}{n_3R_2}-\frac{(1-n_1)(n_3-1)}{n_3R_1R_2}D} \quad \text{[Equation 5]}$$

The first lens group G1 may include at least one lens having a negative refractive power and satisfying the following inequalities.

$Ndn1<1.65$ [Inequality 6]

$Vdn1>55$ [Inequality 7]

Here, Nd1 denotes a refractive index of a negative lens of the first lens group G1, Vdn1 denotes an Abbe number of the negative lens of the first lens group G1. As the negative lens of the first lens group G1 satisfies Inequalities 6 and 7, a magnification chromatic aberration may be effectively prevented and a Petzval sum may be corrected to be small, and uniform performance up to the peripheral portion of the image plane may be provided. The first lens group G1 may include, for example, a lens that has a negative refractive power, is formed of a crown glass material, and is disposed at the object side O, and a lens that has a positive refractive power, is formed of a flint glass material, and is disposed at the image side I. The negative lens of the first lens group G1 may be formed of a low-dispersion material or an anomalous dispersion material corresponding to FK or PK with respect to the Schott catalog. According to the power arrangement of the air lens of the first lens group G1, at least two lenses formed of a material satisfying Ndn1<1.65, Vdn1>55 may be included.

Meanwhile, a lens having a positive refractive power of the first lens group G1 may satisfy the following inequality.

$Ndp1>1.75$ [Inequality 8]

Here, Ndp1 denotes a refractive index of the lens of the first lens group G1 having a positive refractive power.

For example, if a lens having a positive refractive power is formed of a LASF or SF material, aberration may be easily corrected in regard to correction of a Petzval sum; however, if a material satisfying Ndp1>1.75 is used, the material costs may be reduced.

The single focus lens system 100 may satisfy the following inequality.

$0.4<Fp1/F<2.0$ [Inequality 9]

Here, F denotes the overall focal lens of the single focus lens system 100, and Fp1 denotes a focal length of the lens having a positive refractive power of the first lens group G1. If (Fp1/F) is greater than the upper limit of Inequality 9 or is less than the lower limit of Inequality 9, it is difficult to correct chromatic aberration, and if (Fp1/F) is greater than the upper limit of Inequality 9, the refractive power of the first lens group decreases but the refractive power of the second lens group G2 increases to compensate for the small refractive power of the first lens group G1, thereby making correction of aberration difficult.

The first and second air lenses 2 and 4 of the first lens group G1 include at least one aspherical surface, and may satisfy the following inequality.

$1.5<Haph*F/ID<4.0$ [Inequality 10]

Here, Haph denotes a distance from a point where a ray passing through a center of an aperture among light fluxes, which are formed as an image at the highest image height of a diagonal line of an image plane IMG, meets the aspherical surface to an optical axis; F denotes the overall focal length; and ID denotes a length of a diagonal line of the image plane IMG. If (Haph*F/ID) is greater than the upper limit of Inequality 10, an effective aperture of the aspherical surface increases, and thus a size of a lens system is increased, and it may be difficult to manufacture the aspherical surface. Accordingly, when Inequality 10 is satisfied, distortion, astigmatism, and astigmatic field curvature may be corrected, thereby obtaining a high image quality up to the peripheral portion of the image plane.

The first lens group G1 may satisfy the following inequalities:

$-0.5<(R1air1-R2air1)/(R1air1+R2air1)<-0.1$ [Inequality 11]

$-1.0<(R1air2-R2air2)/(R1air2+R2air2)<-0.3$ [Inequality 12]

Here, R1air1 denotes a curvature radius of the first air lens 2 at the object side O; R2air1 denotes a curvature radius of the first air lens 2 at the image side I; R1air2 denotes a curvature radius of the second air lens 4 at the object side O; and R2air2 denotes a curvature radius of the second air lens 4 at the image side I.

Inequality 11 is related to curvature radius of the first air lens 2; by using the first air lens 2, astigmatism, astigmatic field curvature, and distortion may be corrected. In addition, as the first air lens 2 satisfies Inequality 11, a back focal length may be guaranteed and also the overall length may be reduced. If (R1air1−R2air1)/(R1air1+R2air1) is less than the lower limit of Inequality 11, it is difficult to guarantee a back focal length and to obtain a compact size of the single focus lens system 100. If (R1air1−R2air1)/(R1air1+R2air1) is greater than the upper limit of Inequality 11, distortion increases, and astigmatism and astigmatic field curvature may increase. Inequality 12 is related to curvature radius of the second air lens 4; by using the second air lens 4, a back focal length may be guaranteed and also the overall length may be reduced, and spherical aberration, astigmatism, sagittal coma, coma, and distortion, etc. may be corrected. If (R1air2−R2air2)/(R1air2+R2air2) is less than the lower limit of Inequality 12, it is difficult to guarantee a back focal length and to obtain a compact size of the single focus lens system 100. If (R1air2−R2air2)/(R1air2+R2air2) is greater than the upper limit of Inequality 12, sensitivity with respect to distortion, astigmatism, spherical aberration, and coma may increase.

The single focus lens system 100 may satisfy the following inequalities.

$$-8.0 < F1/F < -1.0 \quad [\text{Inequality 13}]$$

$$0.8 < F2/F < 1.4 \quad [\text{Inequality 14}]$$

Inequalities 13 and 14 are related to distribution of refractive power of a lens system. By properly distributing refractive power of a lens system, a focal length, a back focal length, an optical overall length, and F-number of the whole lens system may be adjusted. In addition, aberration may be separately corrected for each of lenses, and accordingly, sensitivity may be appropriately adjusted during the manufacture. Inequality 13 is related to refractive power of the first lens group G1. If (F1/F) is less than the lower limit of Inequality 13, it is difficult to guarantee a long back focal length and to reduce the overall length of the lens system. If (F1/F) is greater than the upper limit of Inequality 13, it is difficult to correct spherical aberration, astigmatism, coma, etc., and moreover, sensitivity may increase and accordingly, the manufacture of lenses may be difficult.

Inequality 14 is related to refractive power of the second lens group G2. If (F2/F) is less than the lower limit of Inequality 14, an optical overall length is increased and thus it is difficult to obtain a compact size of the single focus lens system 100. If (F2/F) is greater than the upper limit of Inequality 14, refractive power of the second lens group G2 is increased, and thus it is difficult to guarantee a long back focal length and to correct aberration. Moreover, sensitivity not only within the second lens group G2 but also with respect to deflection from the first lens group G1 may increase, and accordingly, the manufacture of lenses may be difficult.

Meanwhile, the single focus lens system 100, according to the current embodiment, has a compact size and a wide angle of a half-viewing angle of 40 degrees or greater; accordingly, astigmatic field curvature and image plane tilt may be caused due to deflection of the lenses. Thus, by cementing two lenses of the second lens group G2 that are disposed closest to the image side I, problems such as an air gap formed during the manufacture and deflection may be solved, thereby increasing productivity. That is, while even a small amount of deflection between the sixth lens 8 and the seventh lens 9 may cause image plane tilt of the peripheral portion of the image plane, the astigmatic field curvature and the image plane tilt may be reduced by cementing the sixth lens 8 to the seventh lens 9.

Meanwhile, an aspherical lens used in the single focus lens system 100 according to the current embodiment of the invention is defined as follows.

An aspherical surface may be represented using the equation below, while here an optical axis direction is referred to as an x-axis, and a direction perpendicular to an optical axis direction is referred to as a y-axis. X denotes a distance from a vertex of a lens in the optical axis direction, y denotes a distance in a direction perpendicular to the optical axis direction, K denotes a conic constant, a, b, c, and d refer to aspherical coefficients, and C denotes an inverted number (1/R) of a curvature radius regarding the vertex of the lens.

$$x = \frac{Cy^2}{1 + \sqrt{1 - (K+1)C^2 y^2}} + ay^4 + by^6 + cy^8 + dy^{10} \quad [\text{Equation 15}]$$

According to the current embodiment of the invention, various examples according to various designs for implementing a single focus lens system are shown. Hereinafter, F denotes an overall focal length in units of mm, and F NUMBER denotes an F-number, 2w denotes a viewing angle in units of degrees, and * denotes an aspherical surface. In each drawing, at least one filter 10 may be disposed to be closest to the image side I. The filter 10 may be one of, for example, a low-pass filter, an IR-cut filter, and a cover glass. However, a lens system may also be implemented without a filter. In the drawings, IMG denotes an image plane.

An object distance according to embodiments of the invention is based on an infinite object; if focusing is conducted using a floating method or an inner focusing method, a magnification and an air distance between lenses at the shortest object distance are shown in addition to the infinite object distance. According to the current embodiment, a diagonal length of an image plane, that is, the highest image height, was 14.25 mm.

Embodiment 1

FIG. 1 illustrates a single focus lens system 100, according to an embodiment of the invention, and Table 1 below shows design data according to Embodiment 1. While lens surfaces of each lens are denoted with reference numerals in FIG. 1, the reference numerals of lens surfaces in other examples are omitted.

F: 16.13 mm Fno: 2.07 2w: 88.34

TABLE 1

| Lens surface | Curvature radius | Thickness | Refractive index (Nd) | Abbe number (Vd) |
|---|---|---|---|---|
| S1 | 21.645 | 1.20 | 1.49700 | 81.6 |
| S2 | 8.367 | 2.60 | | |
| S3 | 14.778 | 1.10 | 1.56059 | 68.8 |
| S4* | 8.532 | 2.08 | | |
| ASP | | | | |
| K: −2.00 | | | | |
| a: 3.33e−004 | b: 8.17e−008 | c: −1.10e−008 | d: 0.00e+000 | |
| S5 | 29.184 | 1.00 | 1.64639 | 31.2 |
| S6 | 10.850 | 2.89 | 1.83677 | 37.7 |
| S7 | 49.960 | 3.59 | | |
| ST | Infinity | 3.66 | | |
| S9 | 21.913 | 3.60 | 1.75500 | 52.3 |
| S10 | −21.674 | 2.22 | | |
| S11 | −38.512 | 0.90 | 1.84399 | 23.8 |
| S12 | 23.051 | 0.77 | | |
| S13 | 67.203 | 2.90 | 1.75692 | 52.0 |
| S14* | −17.357 | 19.05 | | |

TABLE 1-continued

| Lens surface | Curvature radius | Thickness | Refractive index (Nd) | Abbe number (Vd) |
|---|---|---|---|---|
| ASP | | | | |
| K: −1.08 | | | | |
| a: 4.83e−005 | b: −6.21e−008 | c: 1.03e−008 | d: 0.00e+000 | |
| S15 | Infinity | 2.92 | 1.51680 | 64.2 |
| S16 | Infinity | 0.51 | | |
| IMG | | | | |

Figure 2:
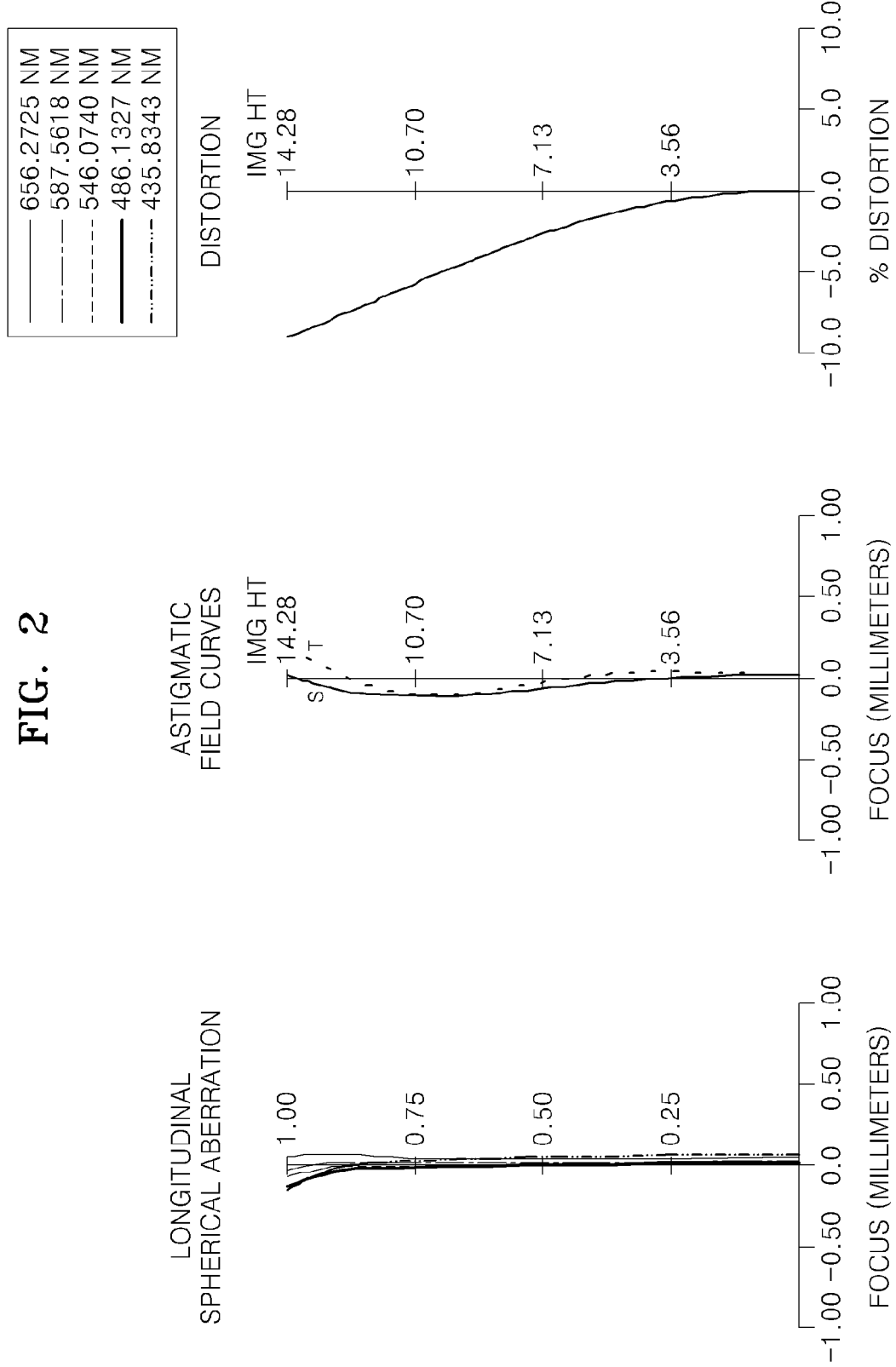
FIG. 2 is a diagram showing longitudinal aberrations of the single focus lens system of FIG. 1.
Figure 3:
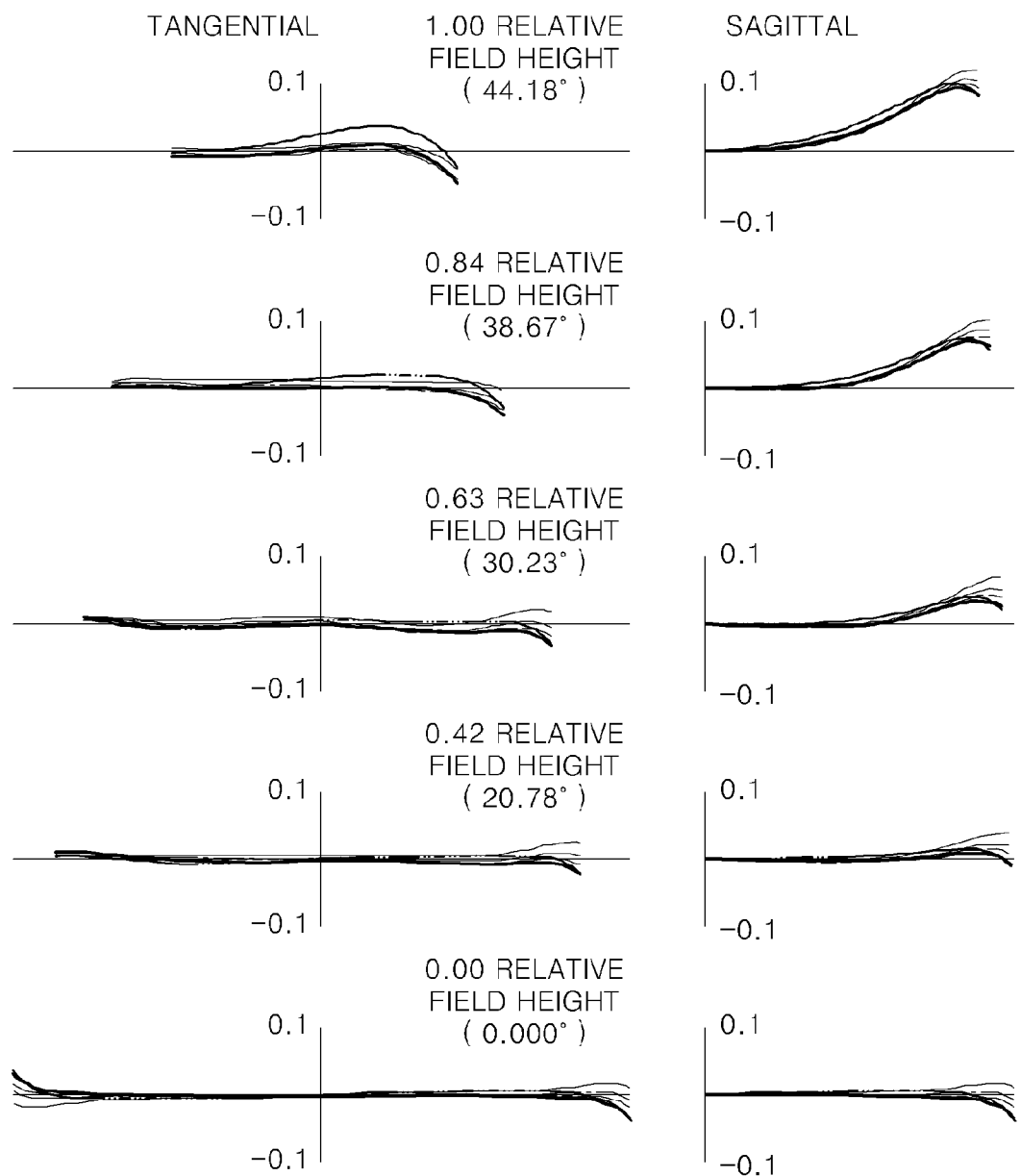
FIG. 3 is a diagram showing horizontal aberrations of the single focus lens system of FIG. 1.

FIG. 2 is a diagram showing longitudinal spherical aberration, astigmatic field curves, and distortion of the single focus lens system 100 of FIG. 1. As astigmatic field curves, a tangential field curvature (T) and sagittal field curvature (S) are shown. FIG. 3 is a diagram showing horizontal aberration of the single focus lens system 100 of FIG. 1.

Embodiment 2

Figure 4:
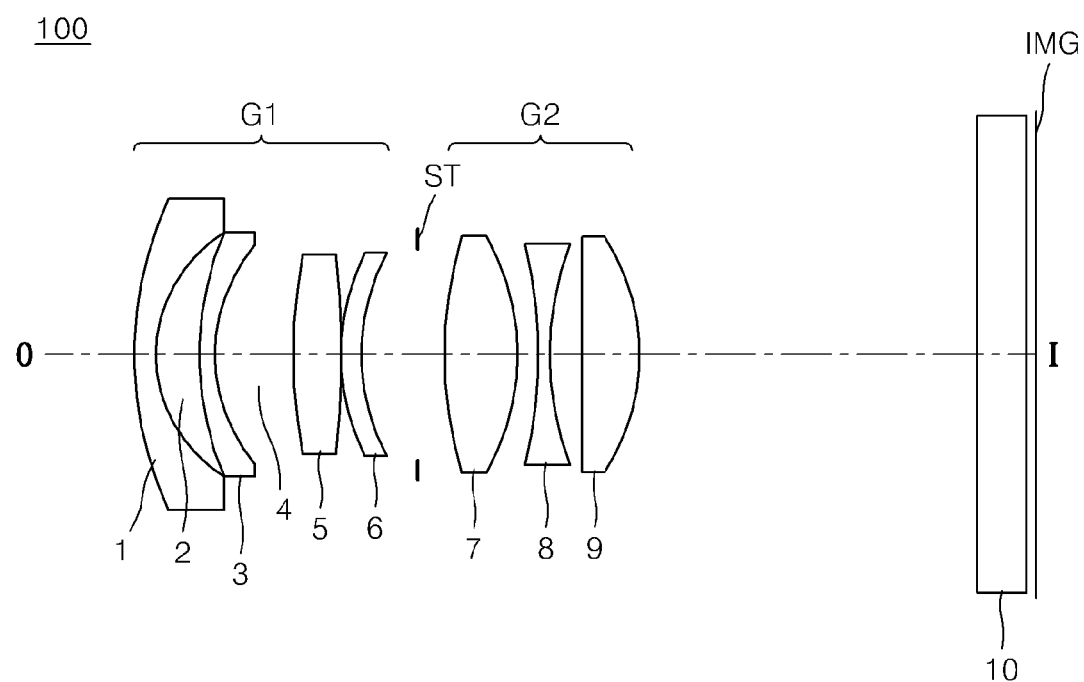
FIG. 4 illustrates a single focus lens system, according to another embodiment of the invention.

FIG. 4 illustrates a single focus lens system, according to another embodiment of the invention, and Table 2 below shows design data according to Embodiment 2.
F: 16.11 mm Fno: 2.08 2w: 89.05

TABLE 2

| Lens surface | Curvature radius | Thickness | Refractive index (Nd) | Abbe number (Vd) |
|---|---|---|---|---|
| S1 | 21.664 | 1.20 | 1.60230 | 63.4 |
| S2 | 8.458 | 2.55 | | |
| S3* | 16.596 | 1.00 | 1.60757 | 62.9 |
| ASP | | | | |
| K: −2.00 | | | | |
| a: 3.23e−005 | b: 4.90e−007 | c: −9.54e−009 | d: 1.59e−010 | |
| S4 | 10.613 | 4.63 | | |
| S5 | 37.026 | 2.74 | 1.90366 | 31.3 |
| S6 | −57.551 | 0.10 | | |
| S7 | 14.100 | 1.00 | 1.84589 | 23.8 |
| S8 | 10.552 | 3.41 | | |
| ST | Infinity | 1.60 | | |
| S10 | 24.658 | 4.30 | 1.75552 | 52.2 |
| S11* | −12.868 | 1.22 | | |
| ASP | | | | |
| K: −0.59 | | | | |
| a: 7.74e−005 | b: −5.10e−007 | c: 1.96e−009 | d: 2.55e−012 | |
| S12 | −23.779 | 0.70 | 1.78191 | 26.7 |
| S13 | 18.049 | 2.01 | | |
| S14 | −292.390 | 3.24 | 1.62203 | 61.4 |
| S15 | −12.888 | 19.92 | | |
| S16 | Infinity | 2.92 | 1.51680 | 64.2 |
| S17 | Infinity | 0.50 | | |
| IMG | | | | |

Figure 5:
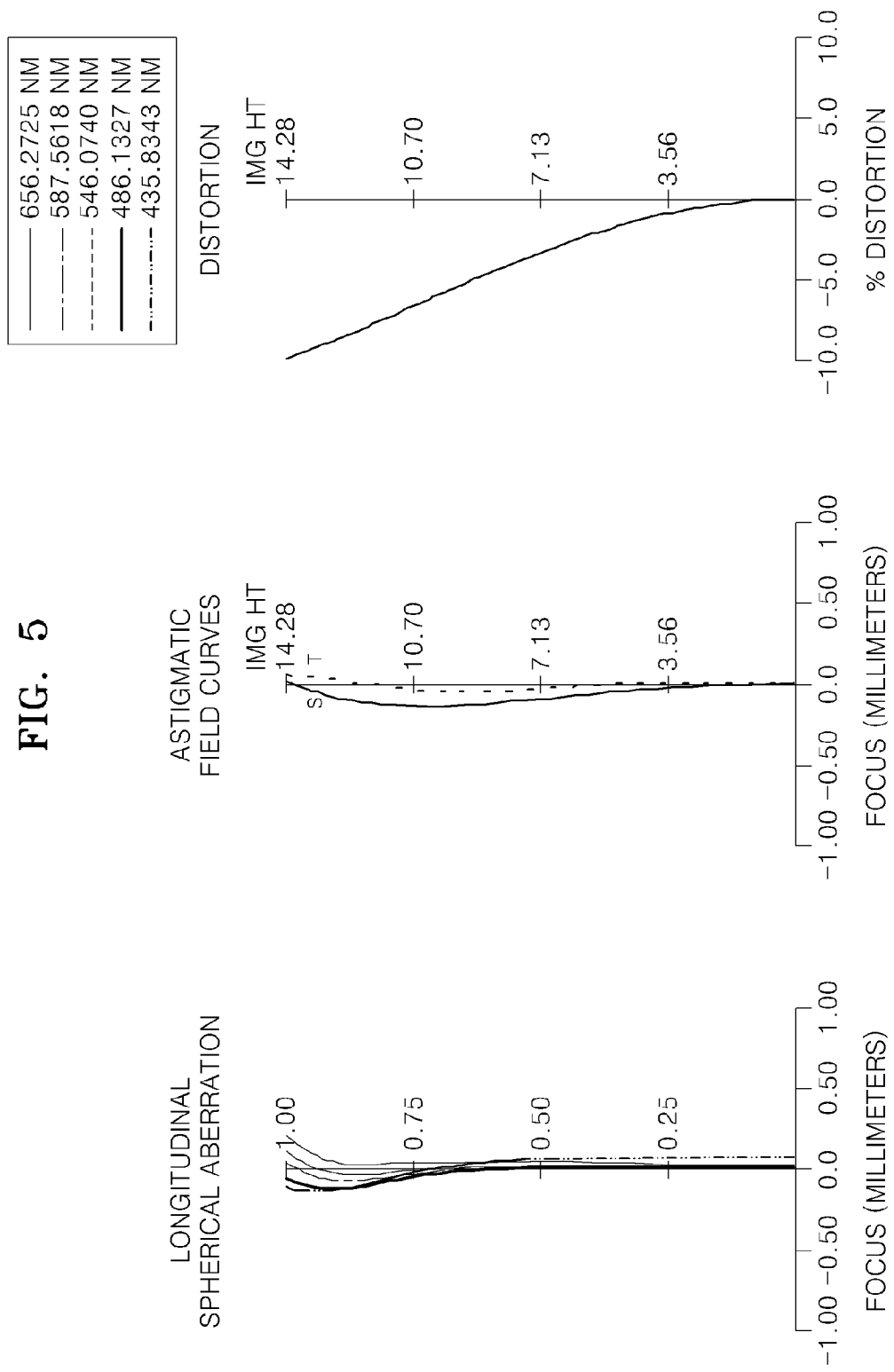
FIG. 5 is a diagram showing longitudinal aberrations of the single focus lens system of FIG. 4.
Figure 6:
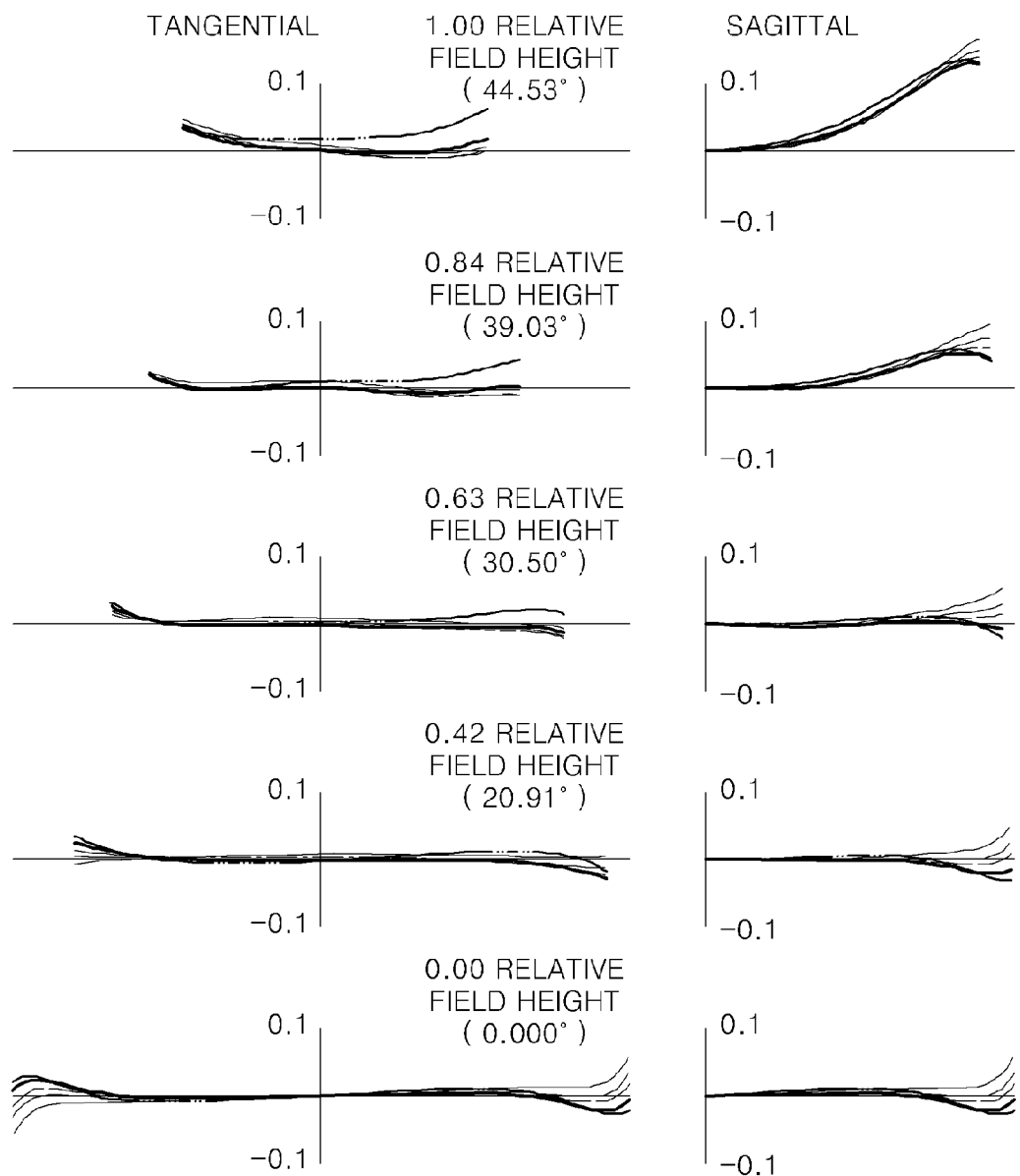
FIG. 6 is a diagram showing horizontal aberrations of the single focus lens system of FIG. 4.

FIGS. 5 and 6 are diagrams showing longitudinal and horizontal aberrations of the single focus lens system of FIG. 4, respectively.

Embodiment 3

Figure 7:
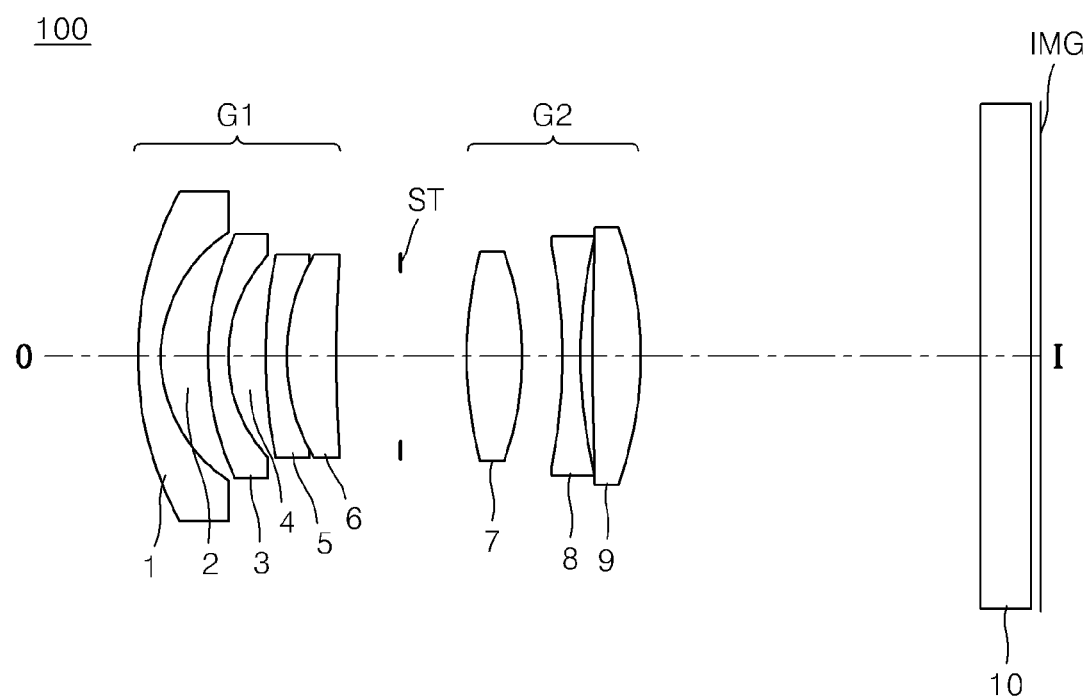
FIG. 7 illustrates a single focus lens system, according to another embodiment of the invention.

FIG. 7 illustrates a single focus lens system according to another embodiment of the invention, and Table 3 below shows design data according to Embodiment 3.
F: 16.12 mm Fno: 2.47 2w: 88.36

TABLE 3

| Lens surface | Curvature radius | Thickness | Refractive index (Nd) | Abbe number (Vd) |
|---|---|---|---|---|
| S1 | 19.940 | 1.30 | 1.48749 | 70.4 |
| S2 | 8.384 | 2.63 | | |

TABLE 3-continued

| Lens surface | Curvature radius | Thickness | Refractive index (Nd) | Abbe number (Vd) |
|---|---|---|---|---|
| S3 | 15.254 | 1.20 | 1.58313 | 59.0 |
| S4* | 8.078 | 2.14 | | |
| ASP | | | | |
| K: −1.00 | | | | |
| a: 1.73e−004 | b: 1.35e−006 | c: −9.33e−009 | d: 0.00e+000 | |
| S5 | 30.486 | 1.20 | 1.64769 | 33.8 |
| S6 | 11.391 | 2.75 | 1.83400 | 37.3 |
| S7 | 82.868 | 3.62 | | |
| ST | Infinity | 3.76 | | |
| S9 | 27.329 | 3.10 | 1.75500 | 52.3 |
| S10 | −18.109 | 2.34 | | |
| S11 | −29.051 | 0.90 | 1.84666 | 23.8 |
| S12 | 29.051 | 0.67 | | |
| S13 | 102.394 | 2.84 | 1.75501 | 51.2 |
| S14* | −16.783 | 19.12 | | |
| ASP | | | | |
| K: −1.00 | | | | |
| a: 4.47e−005 | b: 1.57e−007 | c: 5.89e−009 | d: 0.00e+000 | |
| S15 | Infinity | 2.92 | 1.51680 | 64.2 |
| S16 | Infinity | 0.52 | | |
| IMG | | | | |

Figure 8:
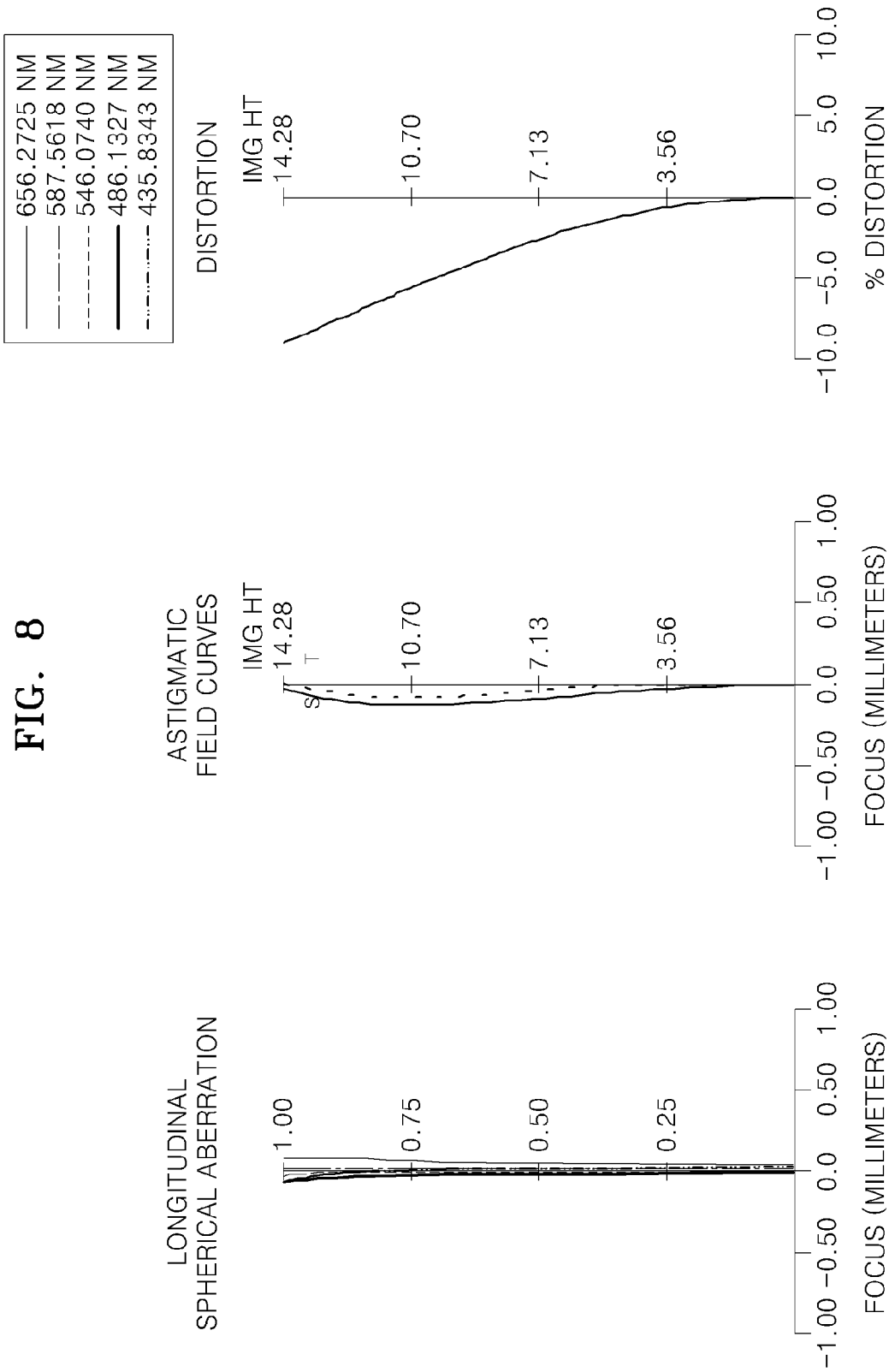
FIG. 8 is a diagram showing longitudinal aberrations of the single focus lens system of FIG. 7.
Figure 9:
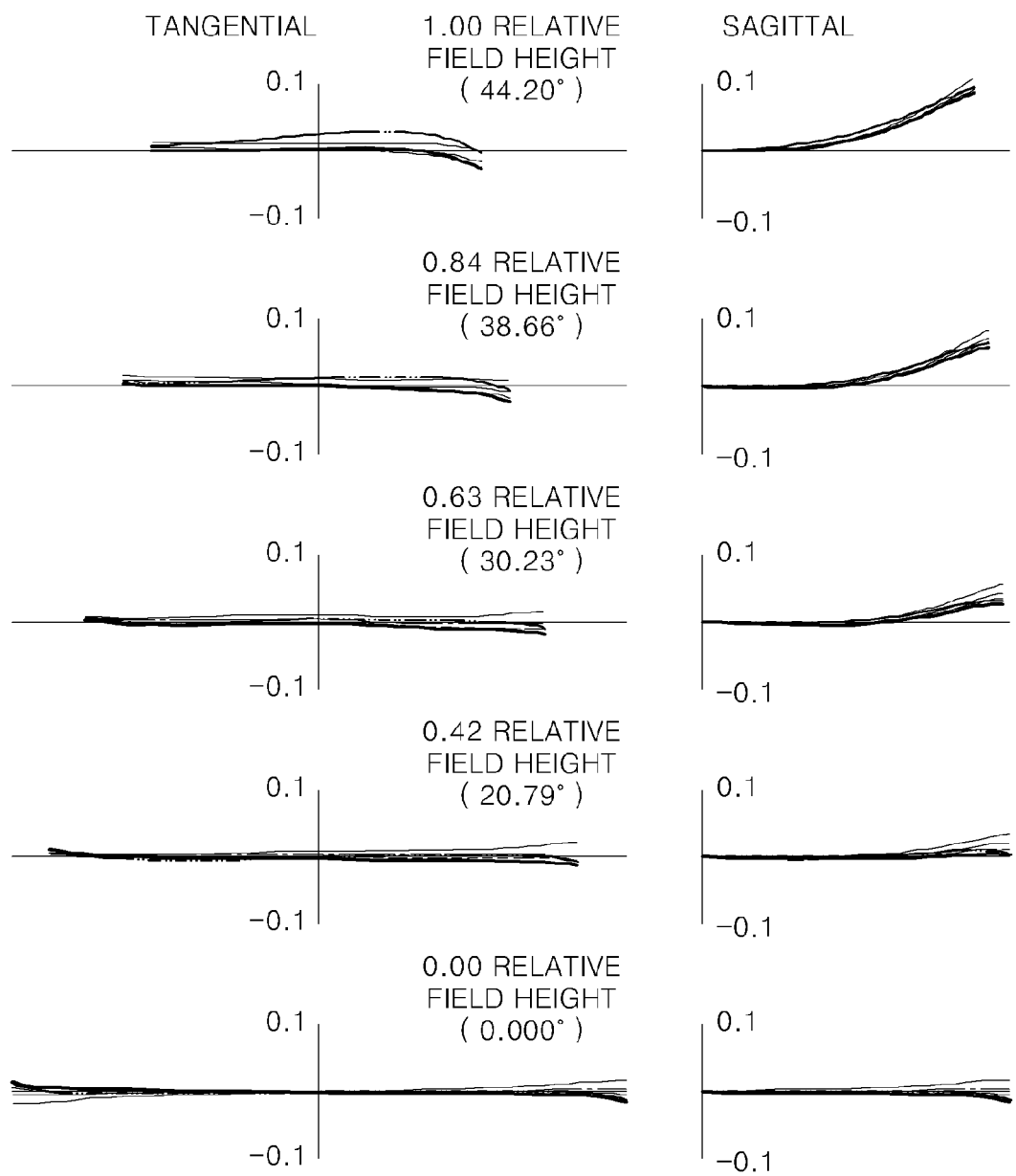
FIG. 9 is a diagram showing horizontal aberrations of the single focus lens system of FIG. 7.

FIGS. 8 and 9 are diagrams showing longitudinal and horizontal aberrations of the single focus lens system of FIG. 7, respectively.

Embodiment 4

Figure 10:
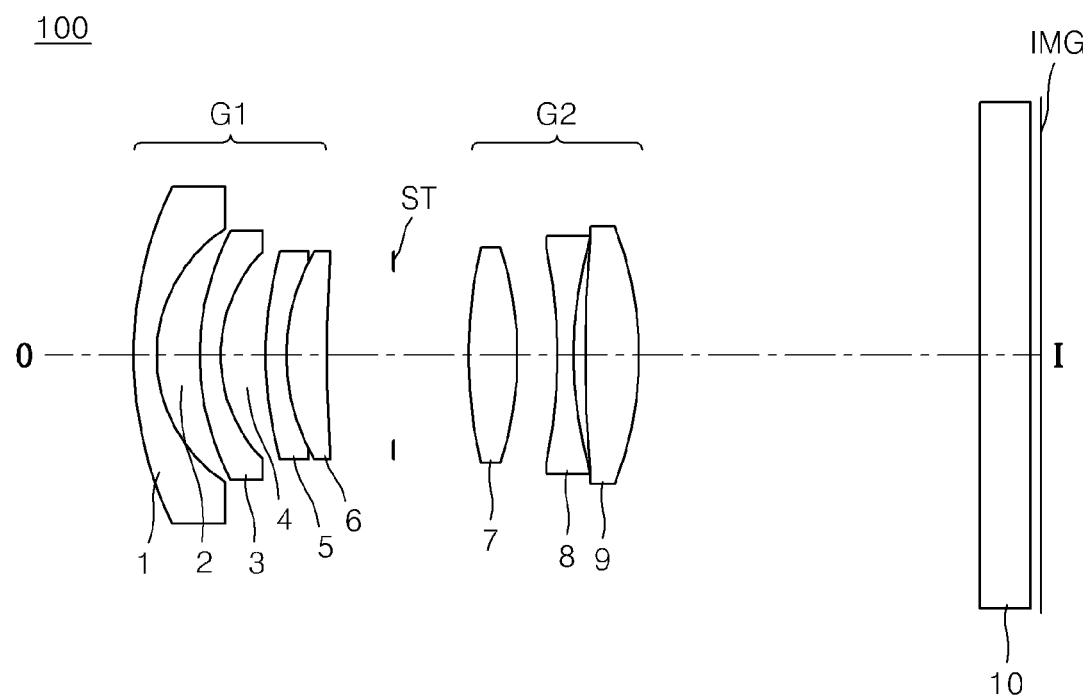
FIG. 10 illustrates a single focus lens system, according to another embodiment of the invention.

FIG. 10 illustrates a single focus lens system according to another embodiment of the invention, and Table 4 below shows design data according to Embodiment 4.
F: 16.12 mm Fno: 2.46 2w: 88.38

TABLE 4

| Lens surface | Curvature radius | Thickness | Refractive index (Nd) | Abbe number (Vd) |
|---|---|---|---|---|
| S1 | 22.187 | 1.20 | 1.48749 | 70.4 |
| S2 | 8.524 | 2.40 | | |
| S3 | 14.667 | 1.10 | 1.58913 | 61.2 |
| S4* | 8.292 | 2.58 | | |
| ASP | | | | |
| K: −1.00 | | | | |
| a: 1.58e−004 | b: 1.12e−006 | c: −7.94e−009 | d: 0.00e+000 | |
| S5 | 25.748 | 1.20 | 1.66986 | 29.8 |
| S6 | 12.142 | 2.27 | 1.83751 | 36.1 |
| S7 | 70.718 | D1 | | |
| ST | Infinity | 4.09 | | |
| S9 | 25.151 | 2.75 | 1.75500 | 52.3 |
| S10 | −19.120 | 2.36 | | |
| S11 | −26.521 | 0.80 | 1.81805 | 24.4 |
| S12 | 26.521 | 0.73 | | |
| S13 | 87.407 | 2.85 | 1.74396 | 51.6 |
| S14* | −16.486 | D2 | | |
| ASP | | | | |
| K: −1.00 | | | | |
| a: 4.67e−005 | b: 1.54e−007 | c: 6.36e−009 | d: 0.00e+000 | |
| S15 | Infinity | 2.92 | 1.51680 | 64.2 |
| S16 | Infinity | 0.52 | | |
| IMG | | | | |

Table 5 below shows an air gap D1 between a lens of a first lens group G1 that is closest to an image side and a stop, and an air gap D2 between a lens of a second lens group G2 that is closest to the image side and an object side of a filter, when focusing is conducted.

TABLE 5

|    | Infinity | Macro | Magnification |
|----|----------|-------|---------------|
| D1 | 3.66     | 3.40  | 0             |
| D2 | 18.89    | 22.20 | 0.2           |

Figure 11:
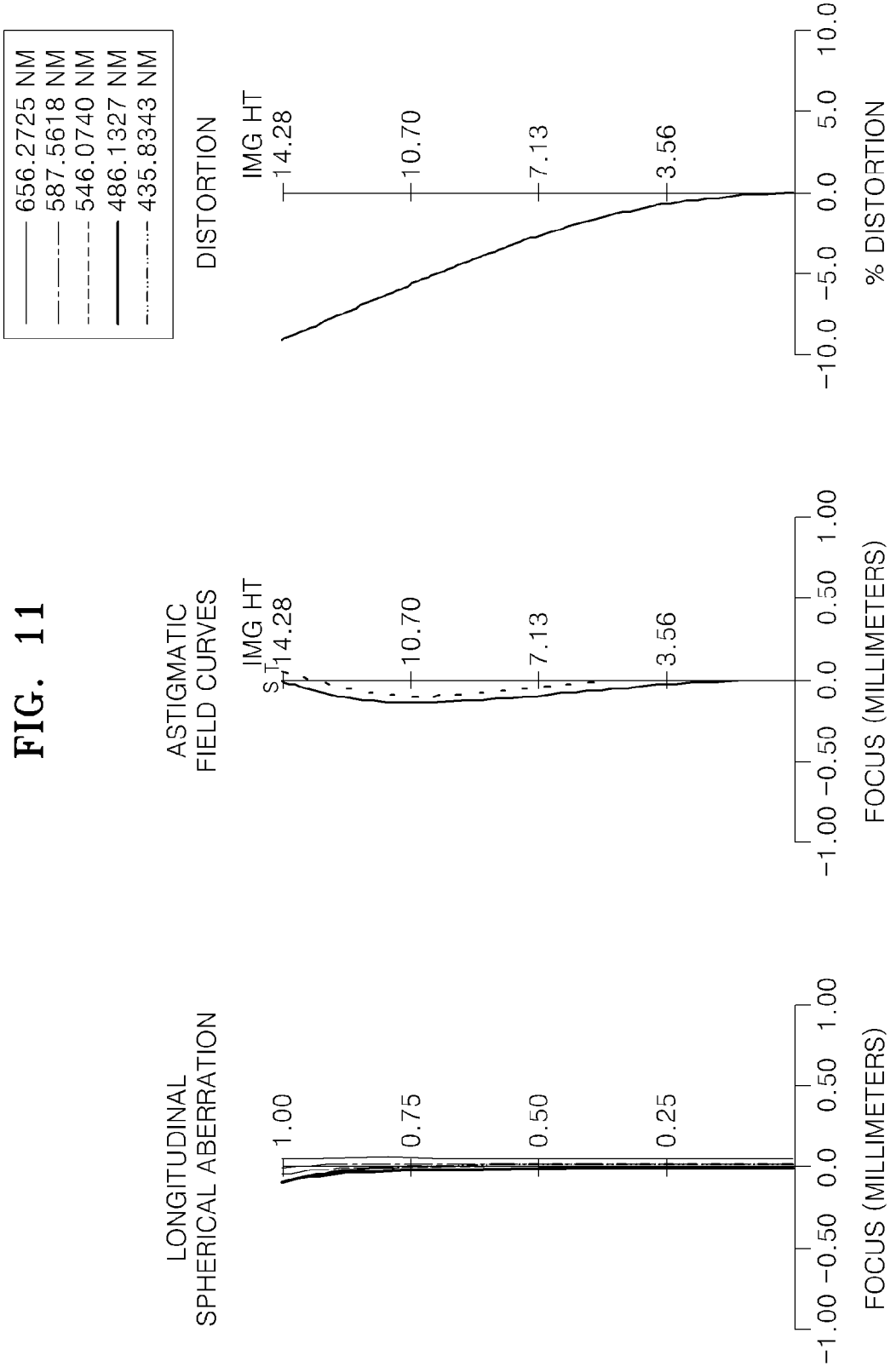
FIG. 11 is a diagram showing longitudinal aberrations of the single focus lens system of FIG. 10.
Figure 12:
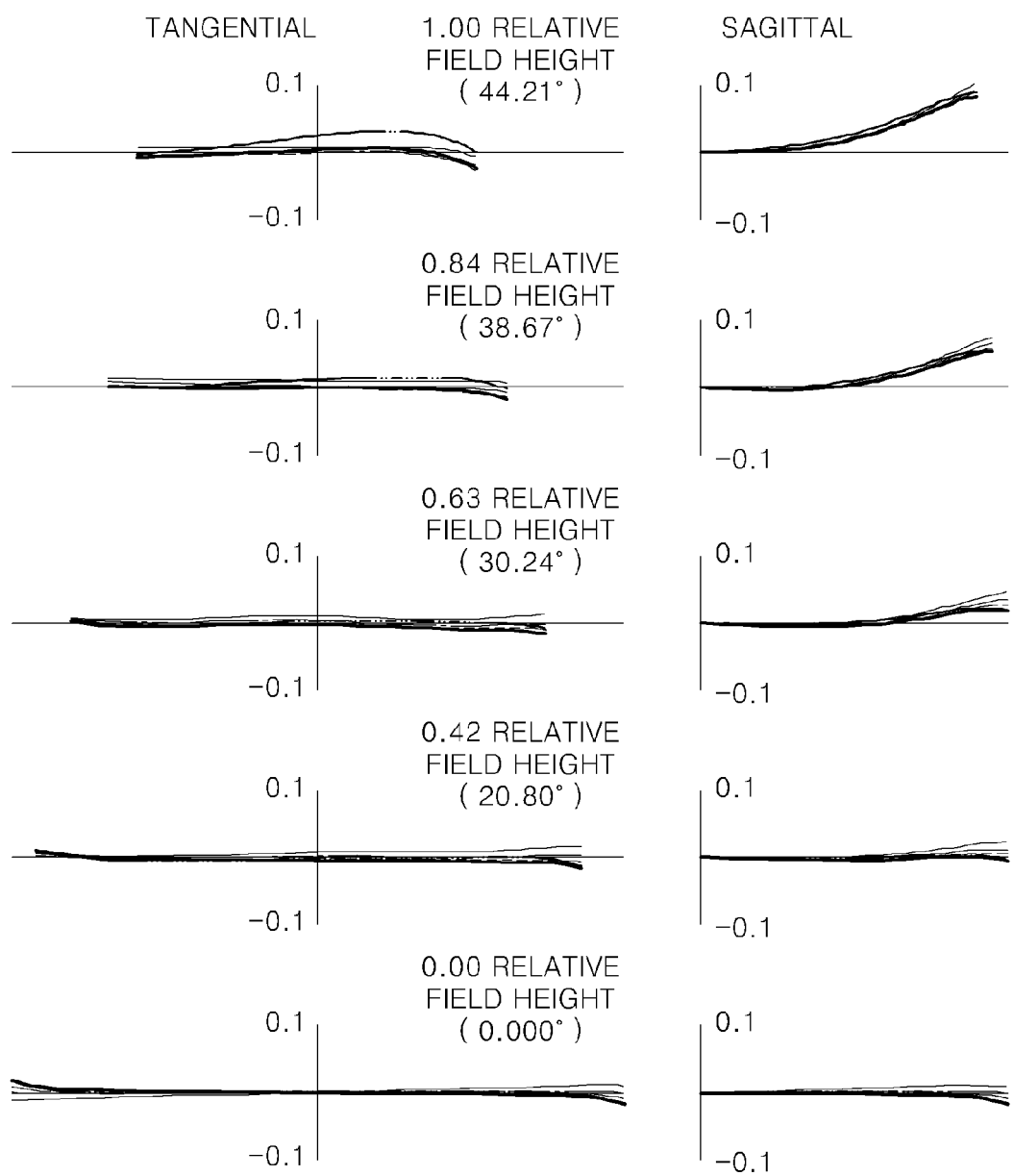
FIG. 12 is a diagram showing horizontal aberrations of the single focus lens system of FIG. 10.

FIGS. 11 and 12 are diagrams showing longitudinal and horizontal aberrations of the single focus lens system of FIG. 10, respectively.

Embodiment 5

Figure 13:
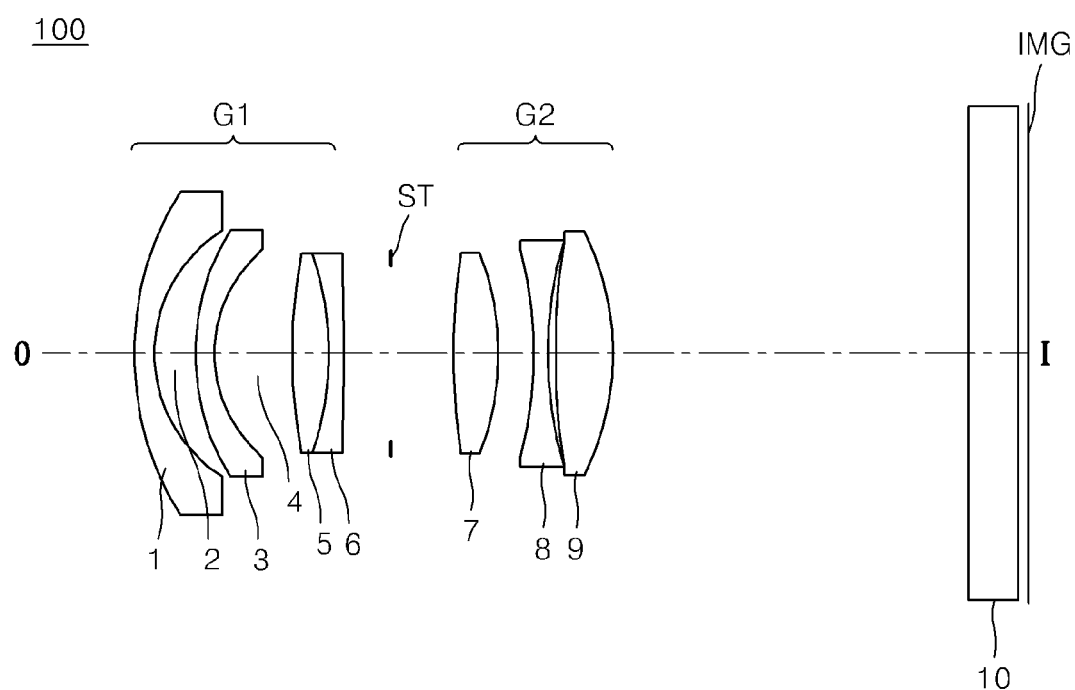
FIG. 13 illustrates a single focus lens system, according to another embodiment of the invention.

FIG. 13 illustrates a single focus lens system according to another embodiment of the invention, and Table 6 below shows design data according to Embodiment 5.

F: 16.11 mm Fno: 2.56 2w: 88.39

TABLE 6

| Lens surface | Curvature radius | Thickness | Refractive index (Nd) | Abbe number (Vd) |
|---|---|---|---|---|
| S1 | 17.898 | 1.20 | 1.60027 | 59.5 |
| S2 | 8.657 | 2.38 | | |
| S3 | 14.514 | 1.10 | 1.58913 | 61.2 |
| S4* | 7.912 | 4.48 | | |
| ASP | | | | |
| K: −0.14 | | | | |
| a: −1.89e−006 | b: 1.03e−006 | c: −3.28e−008 | d: 0.00e+000 | |
| S5 | 39.219 | 1.99 | 1.90225 | 31.1 |
| S6 | −18.500 | 0.87 | 1.83393 | 26.8 |
| S7 | −175.676 | 2.74 | | |
| ST | Infinity | 3.59 | | |
| S9 | 45.724 | 2.47 | 1.77213 | 50.2 |
| S10 | −16.601 | 2.07 | | |
| S11 | −26.677 | 0.80 | 1.80457 | 25.0 |
| S12 | 24.362 | 0.54 | | |
| S13 | 47.784 | 3.17 | 1.59695 | 60.5 |
| S14* | −14.115 | 20.41 | | |
| ASP | | | | |
| K: −0.96 | | | | |
| a: 3.78e−005 | b: 7.32e−008 | c: 5.95e−009 | d: 0.00e+000 | |
| S15 | Infinity | 2.92 | 1.51680 | 64.2 |
| S16 | Infinity | 0.51 | | |
| IMG | | | | |

Figure 14:
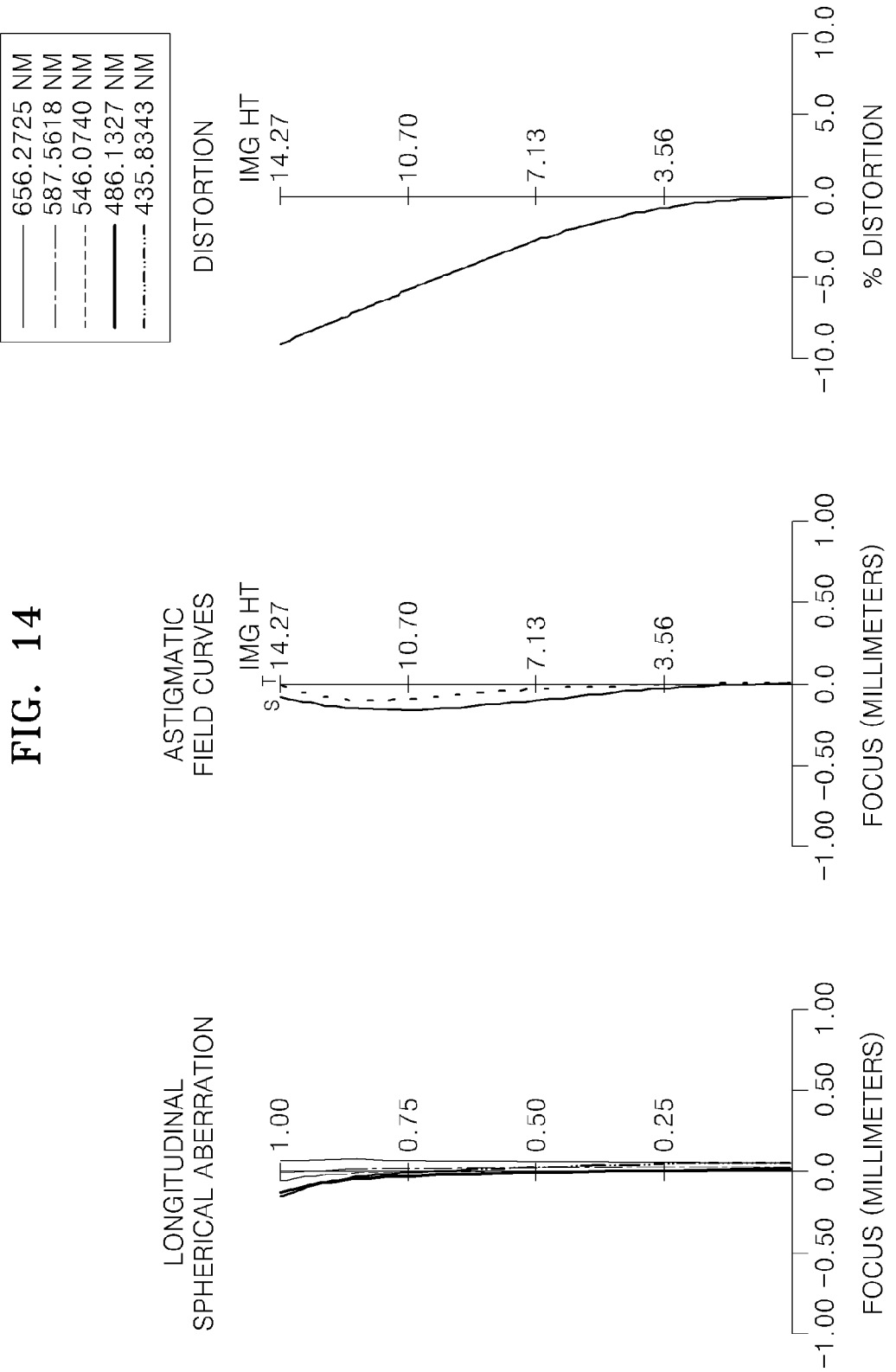
FIG. 14 is a diagram showing longitudinal aberrations of the single focus lens system of FIG. 13.
Figure 15:
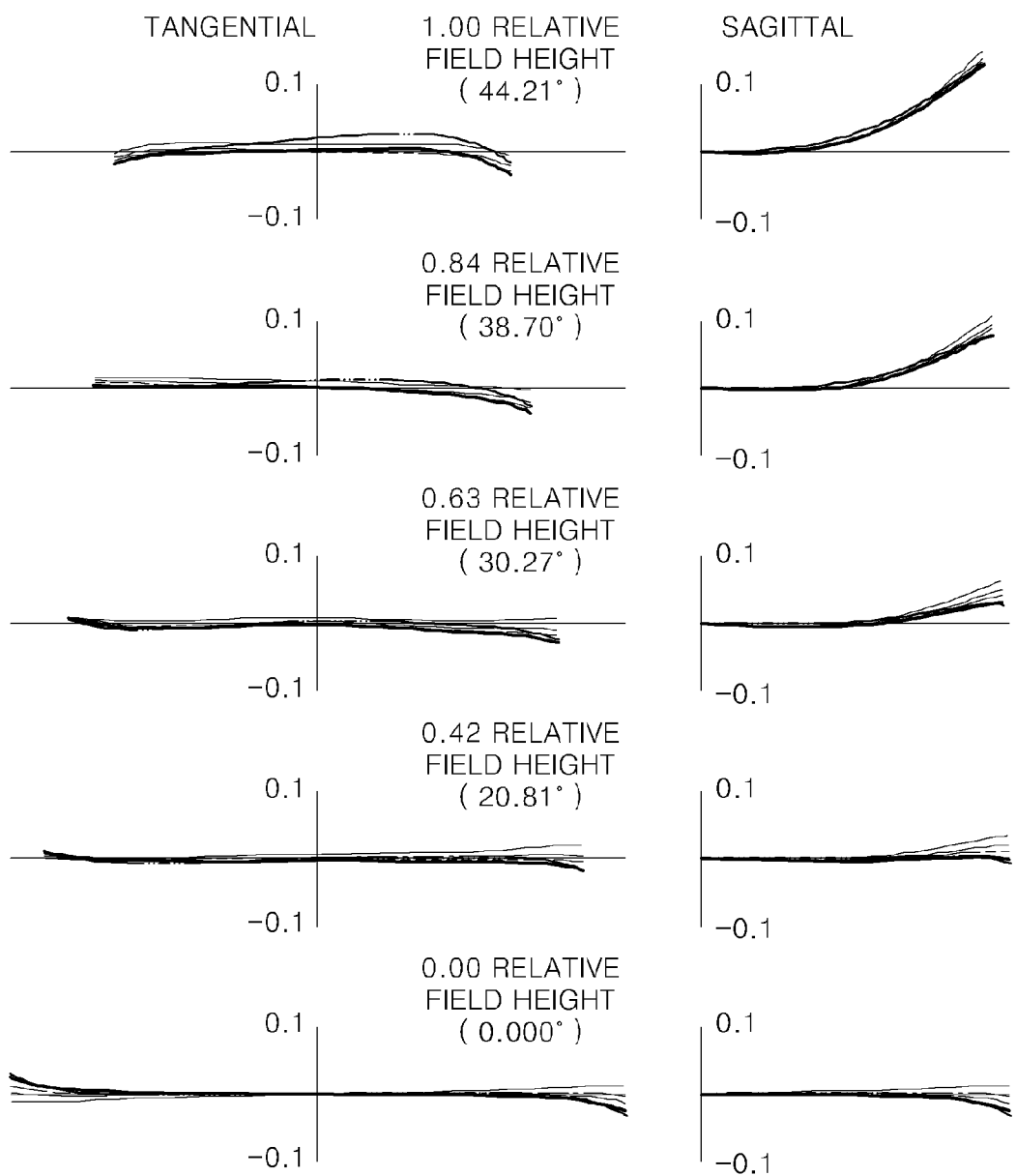
FIG. 15 is a diagram showing horizontal aberrations of the single focus lens system of FIG. 13.

FIGS. 14 and 15 are diagrams showing longitudinal and horizontal aberrations of the single focus lens system of FIG. 13, respectively.

Embodiment 6

Figure 16:
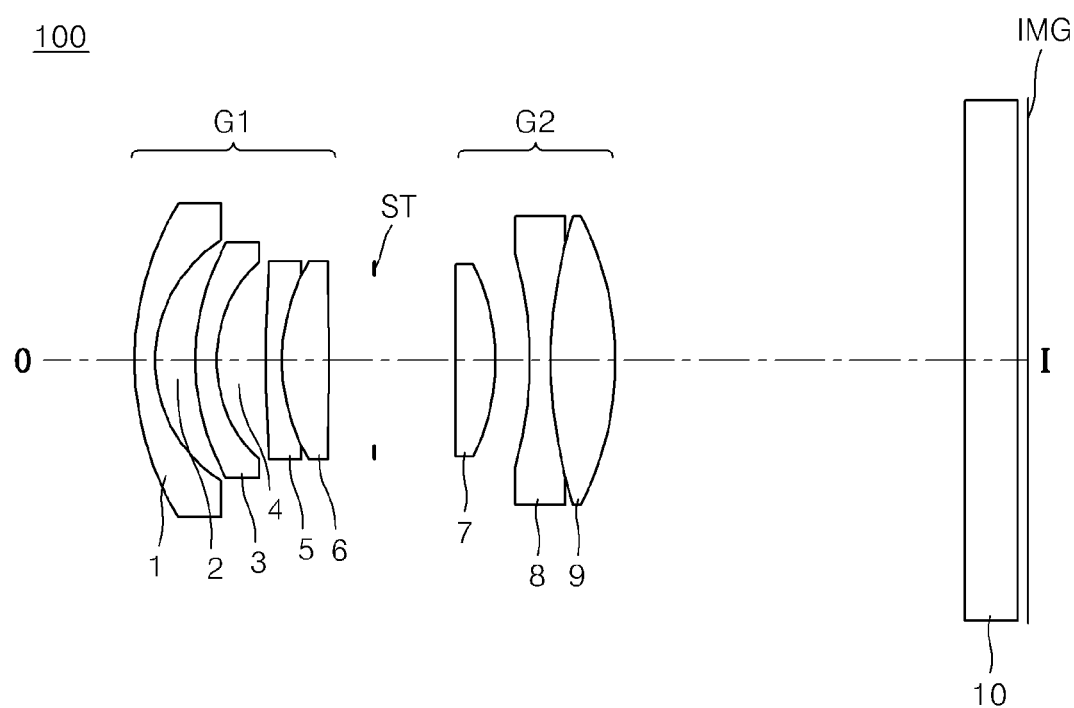
FIG. 16 illustrates a single focus lens system, according to another embodiment of the invention.

FIG. 16 illustrates a single focus lens system according to another embodiment of the invention, and Table 7 below shows design data according to Embodiment 6.

F: 15.86 mm Fno: 2.56 2w: 89.31

TABLE 7

| Lens surface | Curvature radius | Thickness | Refractive index (Nd) | Abbe number (Vd) |
|---|---|---|---|---|
| S1 | 16.439 | 1.20 | 1.56350 | 62.2 |
| S2 | 7.934 | 2.20 | | |
| S3 | 13.120 | 1.10 | 1.58913 | 61.2 |
| S4* | 7.143 | 2.73 | | |
| ASP | | | | |
| K: −1.61 | | | | |
| a: 5.00e−004 | b: 1.17e−006 | c: 0.00e+000 | d: 0.00e+000 | |
| S5 | 74.225 | 0.85 | 1.56239 | 40.5 |
| S6 | 11.236 | 2.59 | 1.81127 | 43.4 |
| S7 | −82.571 | 2.48 | | |
| ST | Infinity | 4.31 | | |
| S9 | 452.415 | 2.18 | 1.77680 | 49.1 |
| S10 | −13.364 | 2.01 | | |
| S11 | −20.750 | 1.00 | 1.78646 | 26.6 |
| S12 | 24.960 | 3.54 | 1.62175 | 58.2 |
| S13* | −14.818 | 19.00 | | |
| ASP | | | | |
| K: −4.17 | | | | |
| a: −7.51e−005 | b: 1.00e−006 | c: 0.00e+000 | d: 0.00e+000 | |
| S14 | Infinity | 2.92 | 1.51680 | 64.2 |
| S15 | Infinity | 0.51 | | |
| IMG | | | | |

Figure 17:
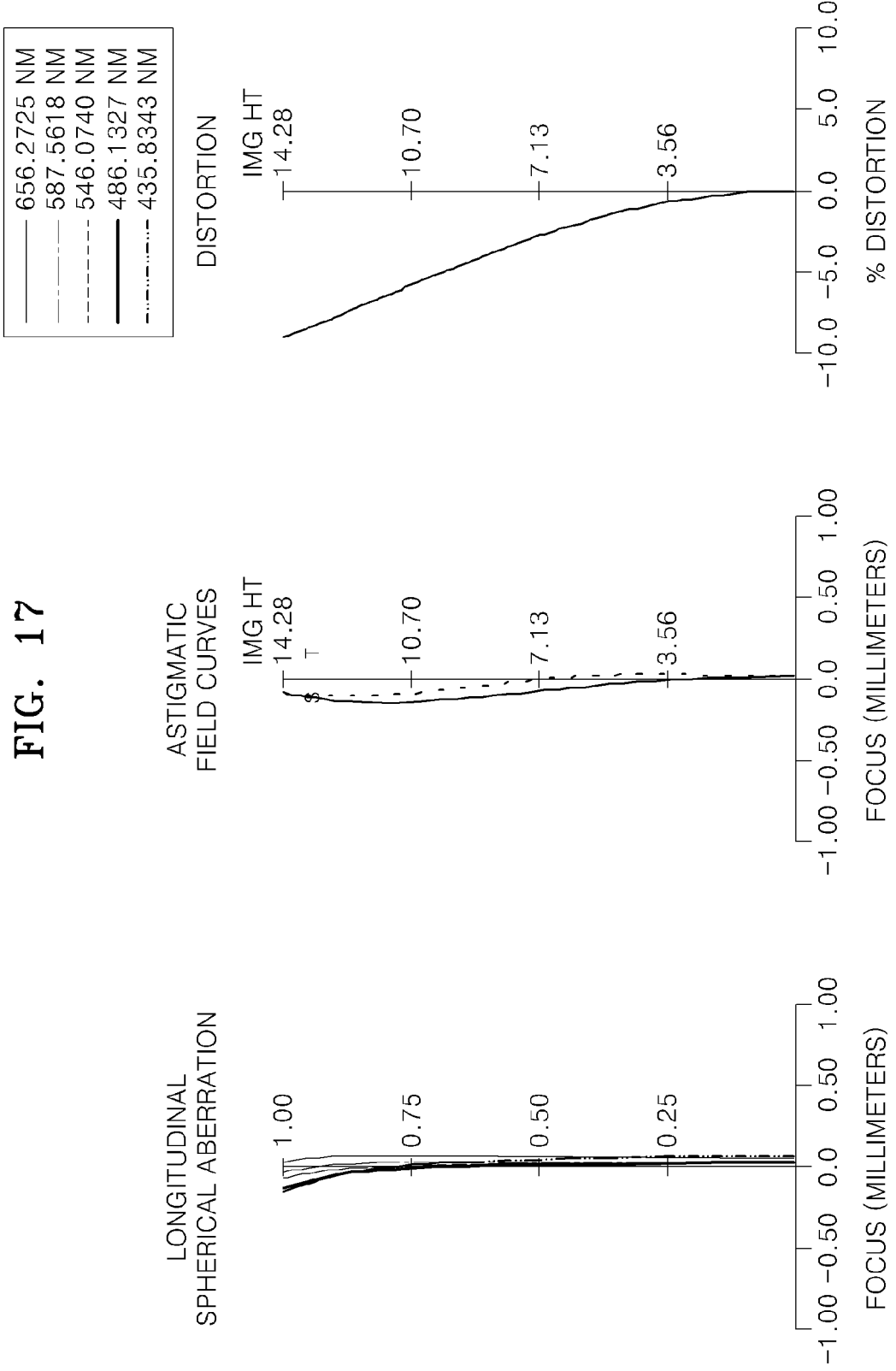
FIG. 17 is a diagram showing longitudinal aberrations of the single focus lens system of FIG. 16.
Figure 18:
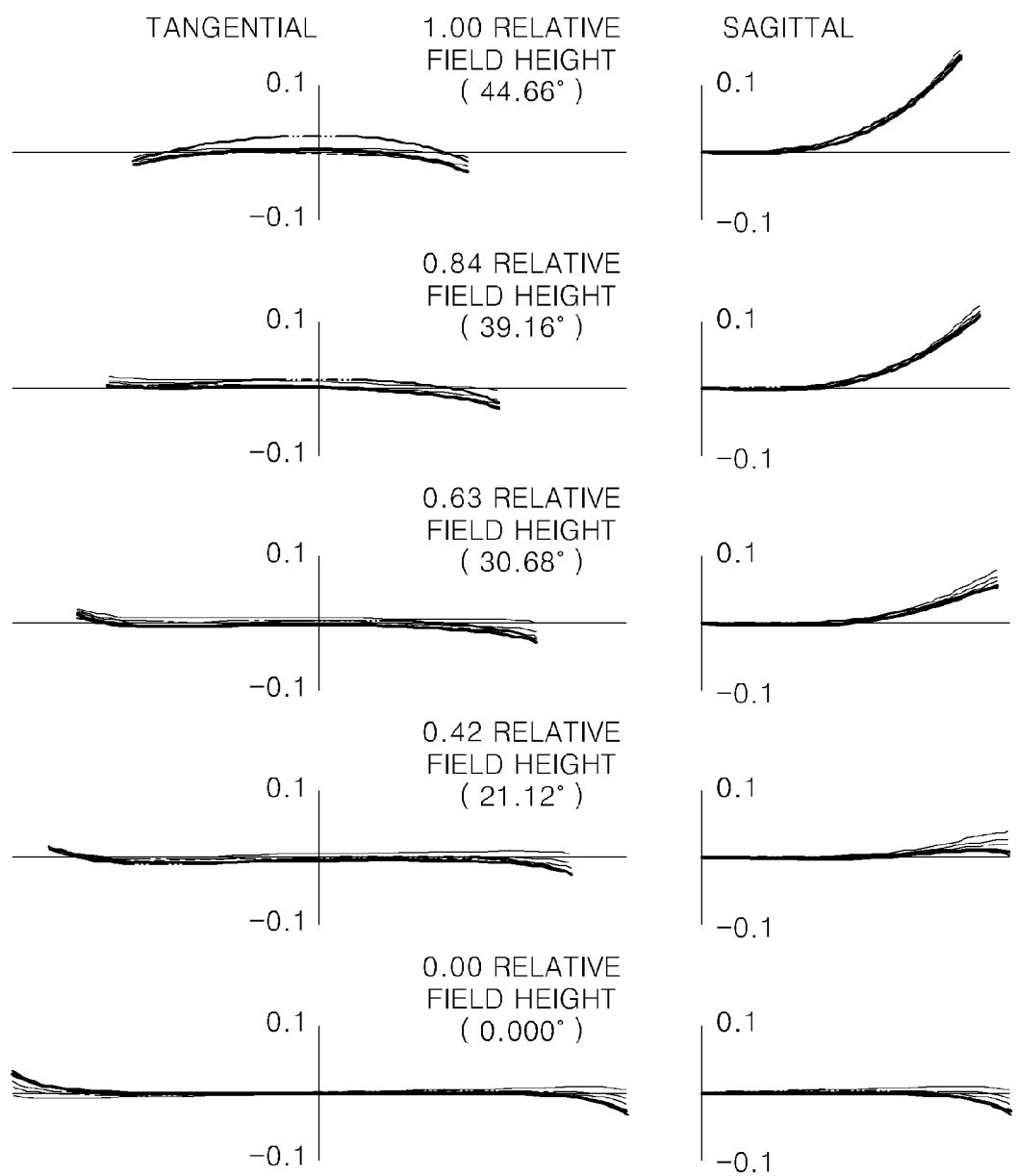
FIG. 18 is a diagram showing horizontal aberrations of the single focus lens system of FIG. 16.

FIGS. 17 and 18 are diagrams showing longitudinal and horizontal aberrations of the single focus lens system of FIG. 16, respectively.

Embodiment 7

Figure 19:
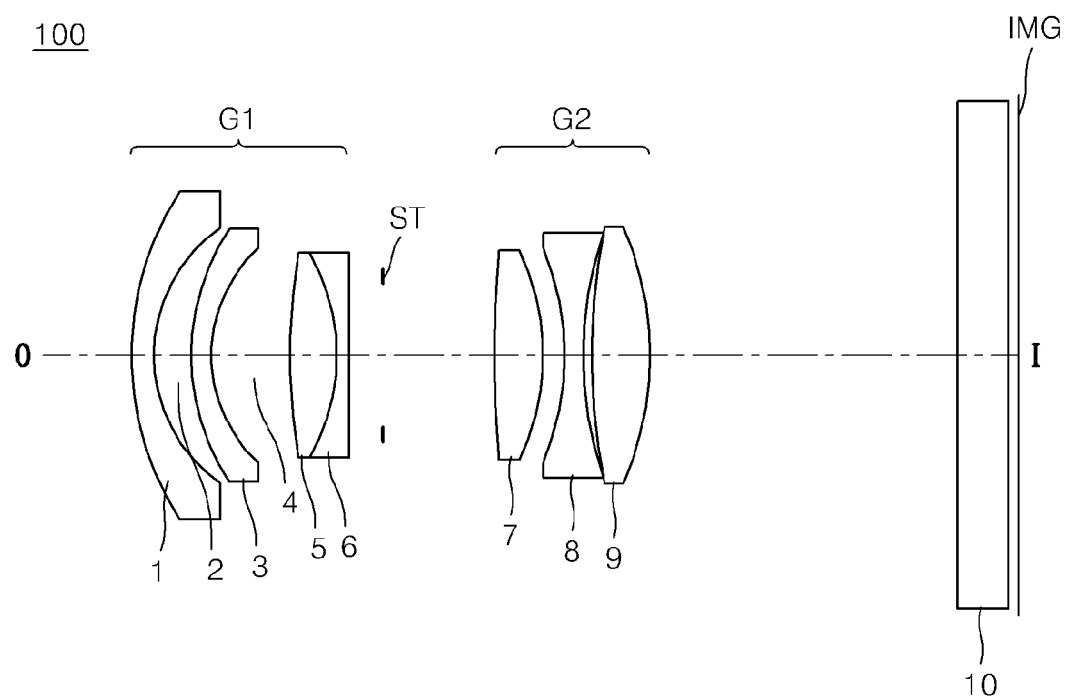
FIG. 19 illustrates a single focus lens system, according to another embodiment of the invention.

FIG. 19 illustrates a single focus lens system according to another embodiment of the invention, and Table 8 below shows design data according to Embodiment 7.

F: 15.54 mm Fno: 2.89 2w: 89.14

TABLE 8

| Lens surface | Curvature radius | Thickness | Refractive index (Nd) | Abbe number (Vd) |
|---|---|---|---|---|
| S1 | 17.615 | 1.20 | 1.64639 | 56.8 |
| S2 | 8.654 | 1.96 | | |
| S3 | 12.657 | 1.10 | 1.59266 | 36.0 |
| S4* | 7.764 | 4.36 | | |
| ASP | | | | |
| K: −0.94 | | | | |
| a: 2.18e−004 | b: 1.98e−006 | c: −1.40e−008 | d: 0.00e+000 | |
| S5 | 34.502 | 2.60 | 1.90349 | 31.3 |
| S6 | −10.968 | 0.80 | 1.81100 | 28.4 |
| S7 | −134.497 | 1.92 | | |
| ST | Infinity | D1 | | |
| S9 | 57.098 | 2.70 | 1.79431 | 47.7 |
| S10* | −11.352 | D2 | | |
| ASP | | | | |
| K: −0.90 | | | | |
| a: 3.22e−005 | b: 1.80e−007 | c: −3.10e−009 | d: 0.00e+000 | |
| S11 | −16.143 | 1.00 | 1.78726 | 26.1 |
| S12 | 23.140 | 0.51 | | |
| S13 | 40.747 | 3.13 | 1.65168 | 56.5 |
| S14 | −19.620 | 17.01 | | |
| S15 | Infinity | 2.92 | 1.51680 | 64.2 |
| S16 | Infinity | 0.51 | | |
| IMG | | | | |

Table 9 below shows an air gap D1 between a lens of a second lens group G2 that is closest to an image side and a stop, and an air gap D2 between a first lens and a second lens of the second lens group G2 from an object side, when focusing is conducted.

TABLE 9

|    | Infinity | Macro | Magnification |
|----|----------|-------|---------------|
| D1 | 6.08     | 5.72  | 0             |
| D2 | 1.22     | 1.64  | 0.08          |

Figure 20:
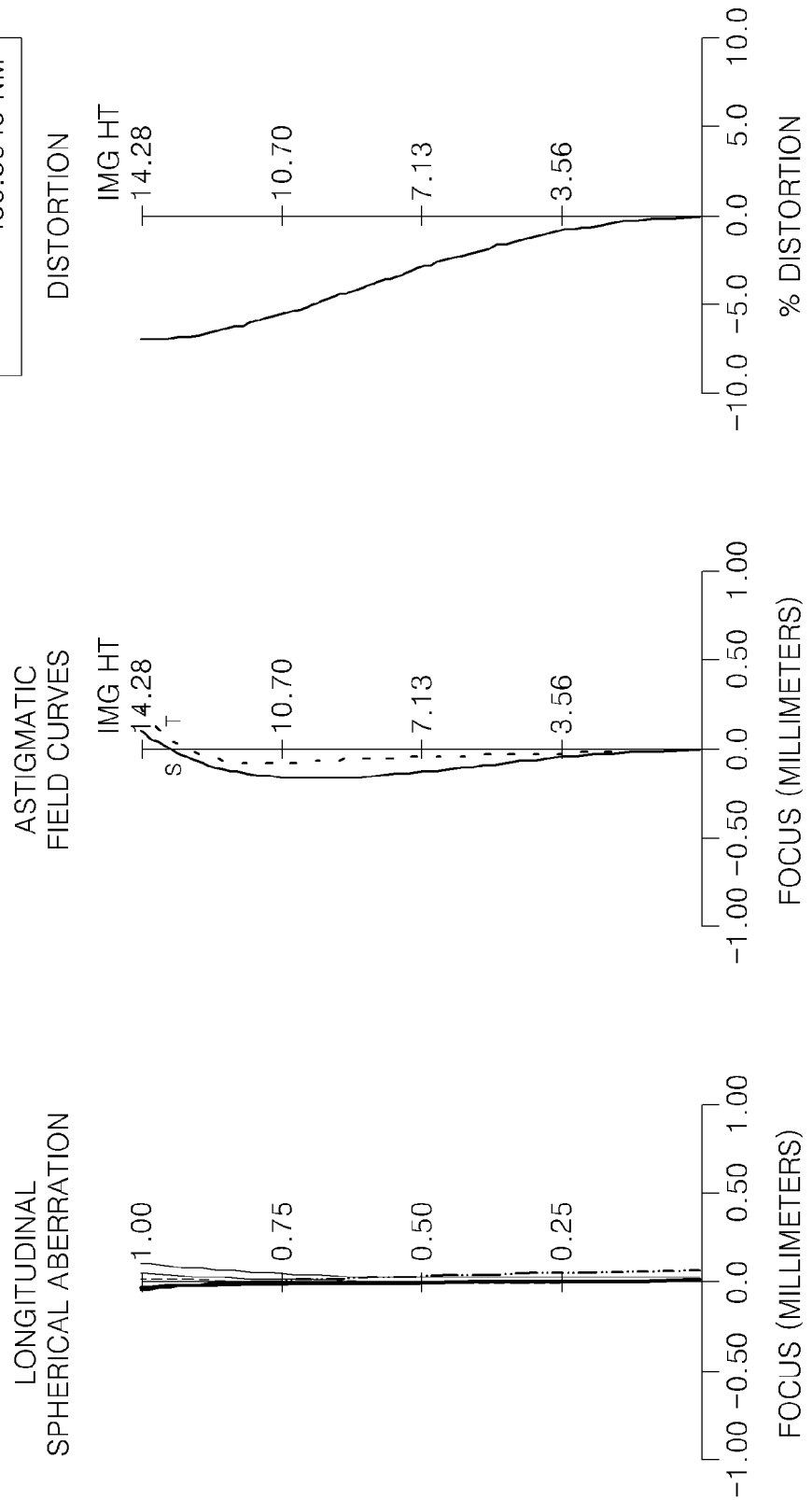
FIG. 20 is a diagram showing longitudinal aberrations of the single focus lens system of FIG. 19.
Figure 21:
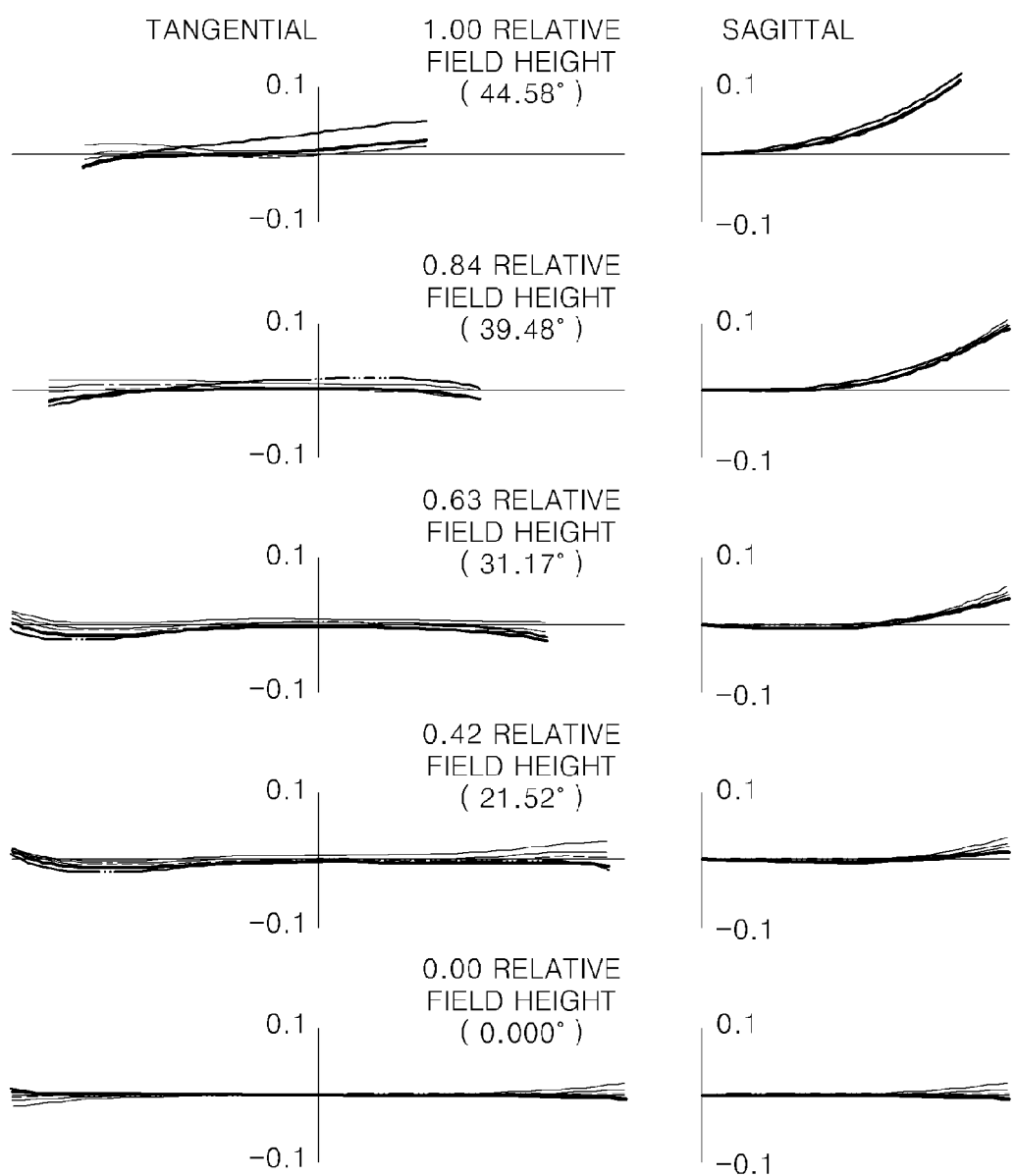
FIG. 21 is a diagram showing horizontal aberrations of the single focus lens system of FIG. 19.

FIGS. 20 and 21 are diagrams showing longitudinal and horizontal aberrations of the single focus lens system of FIG. 19, respectively.

Embodiment 8

Figure 22:
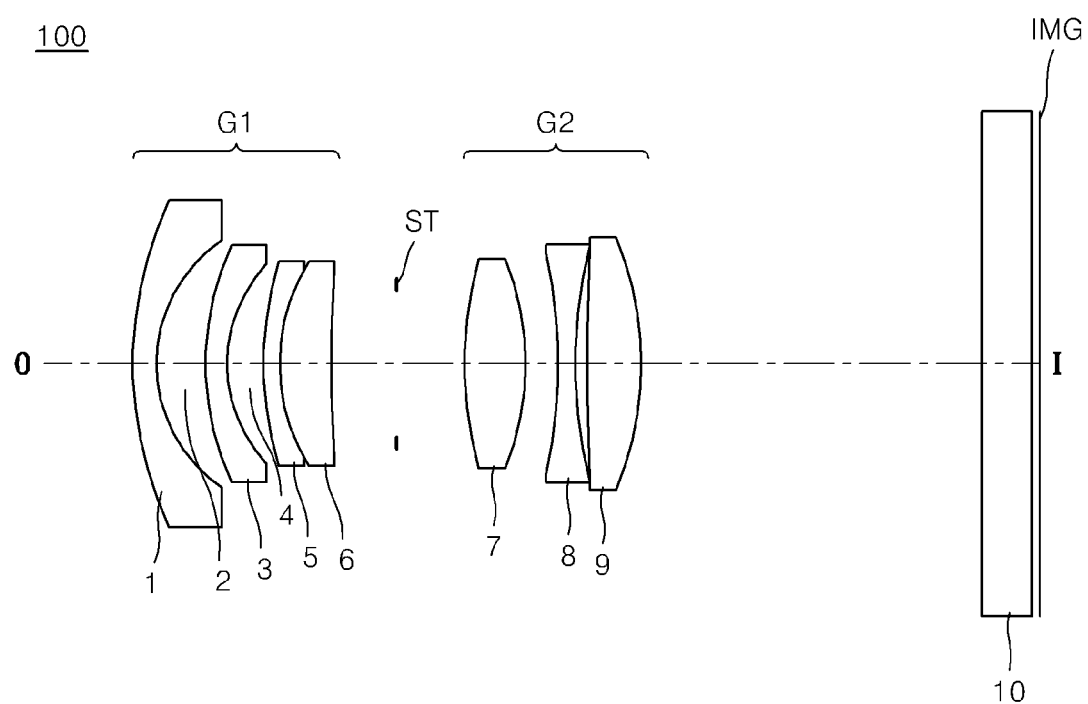
FIG. 22 illustrates a single focus lens system, according to another embodiment of the invention.

FIG. 22 illustrates a single focus lens system according to another embodiment of the invention, and Table 10 below shows design data according to Embodiment 8.

F: 15.97 mm Fno: 2.87 2w: 89.06

TABLE 10

| Lens surface | Curvature radius | Thickness | Refractive index (Nd) | Abbe number (Vd) |
|---|---|---|---|---|
| S1 | 22.400 | 1.30 | 1.48749 | 70.4 |
| S2 | 8.360 | 2.70 | | |
| S3 | 15.550 | 1.25 | 1.54410 | 56.1 |
| S4* | 7.900 | 2.08 | | |
| ASP | | | | |
| K: −0.89 | | | | |
| a: 1.36e−004 | b: 1.32e−006 | c: −2.09e−008 | d: 0.00e+000 | |
| S5 | 22.760 | 0.97 | 1.64769 | 33.8 |
| S6 | 10.768 | 2.87 | 1.83400 | 37.2 |
| S7 | 55.140 | 3.69 | | |
| ST | Infinity | 3.73 | | |
| S9 | 24.975 | 3.30 | 1.75500 | 52.3 |
| S10 | −18.365 | 1.97 | | |
| S11 | −28.300 | 0.90 | 1.84666 | 23.8 |
| S12 | 28.300 | 0.68 | | |
| S13 | 98.000 | 3.00 | 1.73912 | 49.0 |
| S14* | −16.584 | 19.12 | | |
| ASP | | | | |
| K: −1.00 | | | | |
| a: 4.95e−005 | b: 1.87e−007 | c: 6.65e−009 | d: 0.00e+000 | |
| S15 | Infinity | 2.92 | 1.51680 | 64.2 |
| S16 | Infinity | 0.43 | | |
| IMG | | | | |

Figure 23:
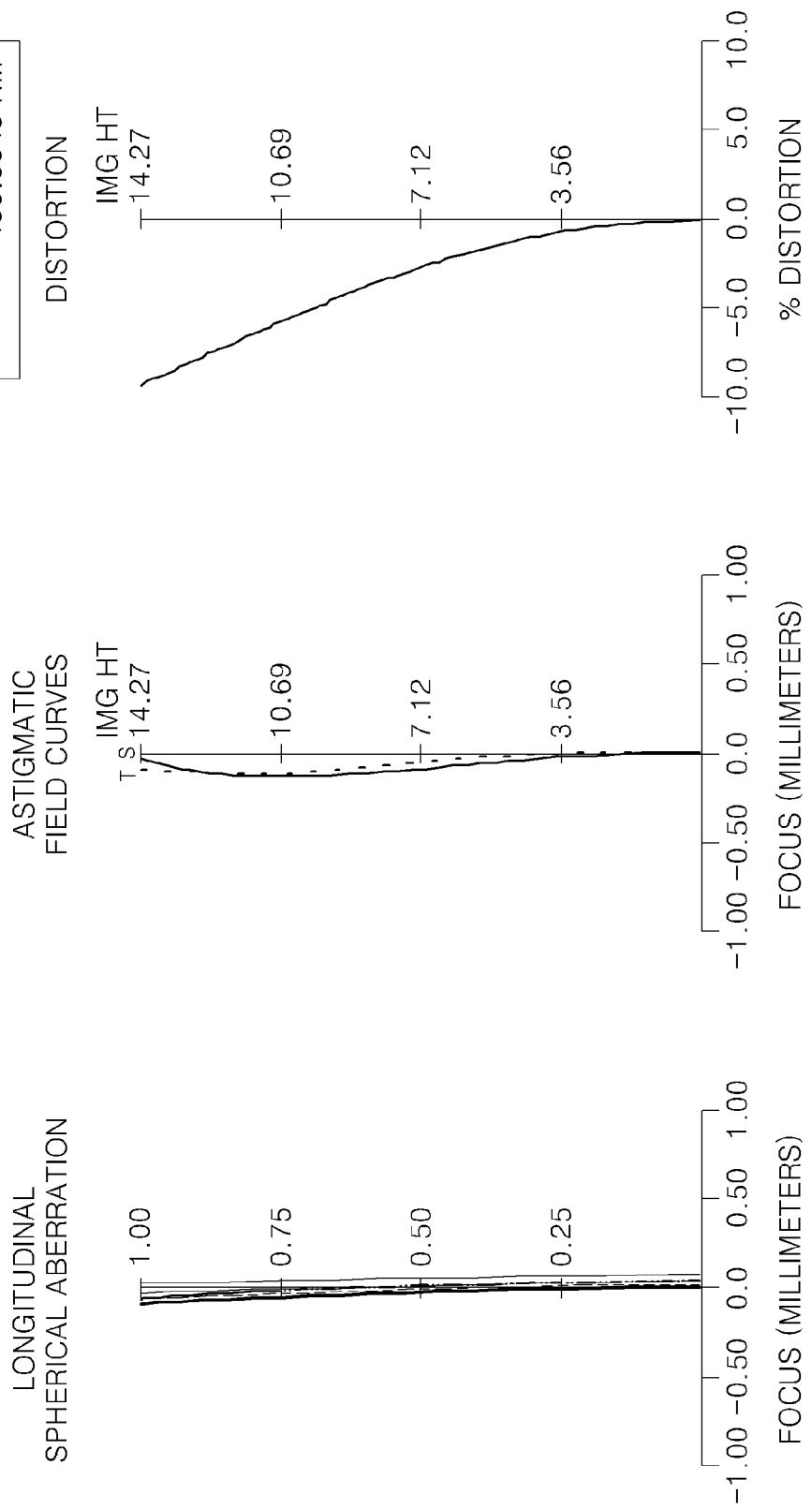
FIG. 23 is a diagram showing longitudinal aberrations of the single focus lens system of FIG. 22.
Figure 24:
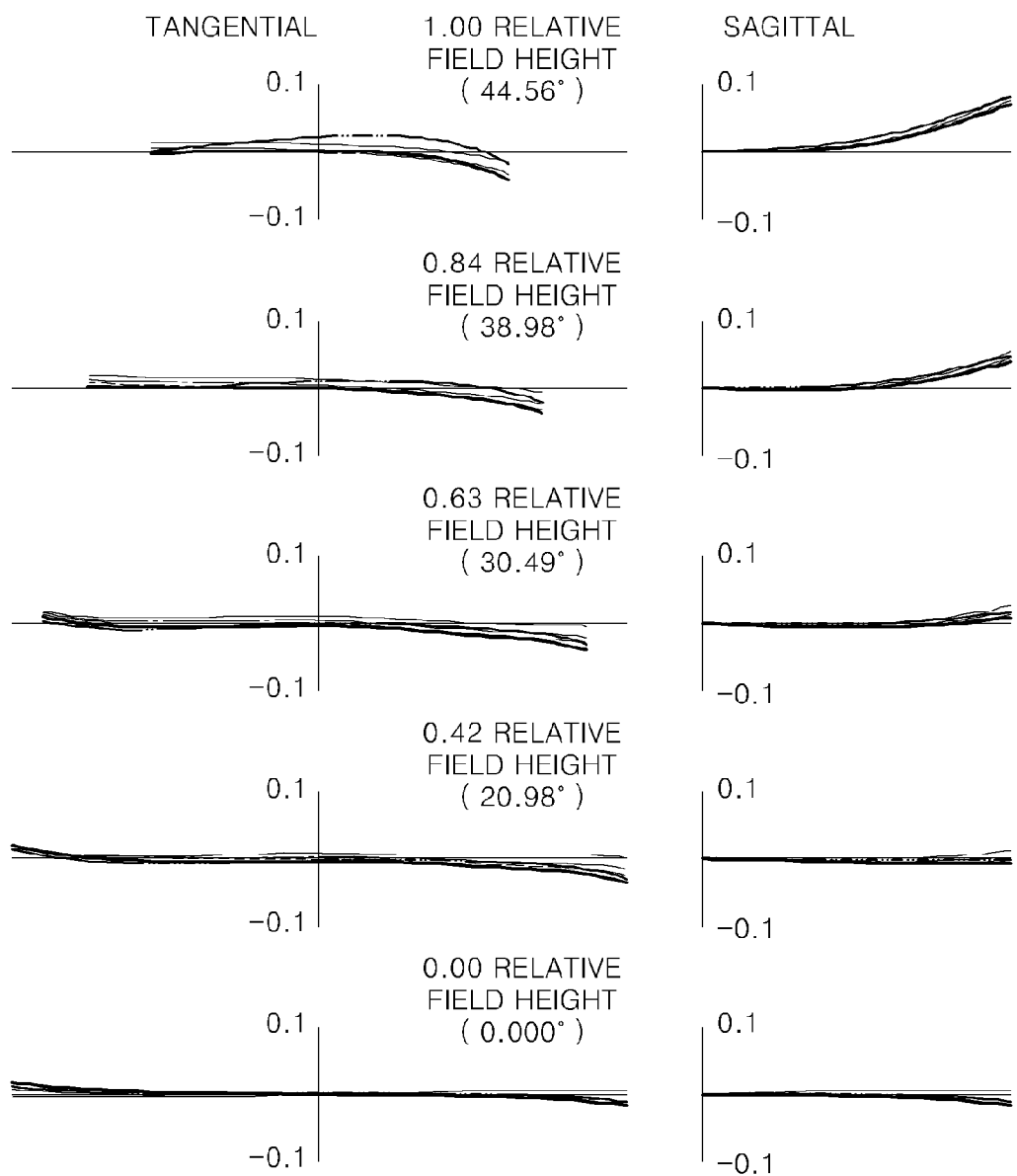
FIG. 24 is a diagram showing horizontal aberrations of the single focus lens system of FIG. 22.

FIGS. 23 and 24 are diagrams showing longitudinal and horizontal aberrations of the single focus lens system of FIG. 22, respectively.

Table 11 below shows that Embodiments 1 through 8 satisfy Inequalities 1 through 3 and Inequalities 9 through 14.

TABLE 11

| | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| Fair1/F | −6.206 | −3.567 | −6.995 | −8.595 | −4.471 | −5.241 | −4.905 | −4.777 |
| Fair2/F | −2.526 | −4.507 | −2.149 | −2.583 | −2.707 | −1.345 | −2.954 | −2.877 |
| Fp2/F | 0.924 | 0.728 | 0.919 | 0.914 | 0.992 | 1.051 | 0.777 | 0.904 |
| Fp1/F | 0.988 | 1.559 | 0.960 | 1.061 | 0.873 | 0.775 | 0.605 | 0.971 |
| Haph * F/ID | 2.388 | 3.079 | 2.396 | 2.437 | 2.344 | 2.076 | 2.220 | 2.845 |
| (R1air1 − R2air1)/(R1air1 + R2air1) | −0.277 | −0.325 | −0.291 | −0.265 | −0.253 | −0.246 | −0.188 | −0.301 |
| (R1air2 − R2air2)/(R1air2 + R2air2) | −0.548 | −0.554 | −0.581 | −0.513 | −0.664 | −0.824 | −0.633 | −0.485 |
| F1/F | −1.642 | −1.846 | −1.765 | −1.912 | −2.376 | −2.760 | −5.543 | −1.809 |
| F2/F | 1.026 | 1.110 | 1.046 | 1.067 | 1.174 | 1.146 | 1.268 | 1.054 |

The single focus lens system 100 according to the embodiments of the invention is a wide angle lens system having a half-viewing angle of from 40 to 45 degrees, with an appropriate back focal length for interchangeable lenses. Also, the single focus lens system 100 has a large aperture, that is, an F-number of 2 to 2.8, and thus an overall length and a size in a radial direction of the lens system may be reduced, resulting in a compact size. Also, magnification chromatic aberration and astigmatic field curvature may be corrected effectively so as to obtain a uniform optical performance up to a peripheral portion of an image.

Figure 25:
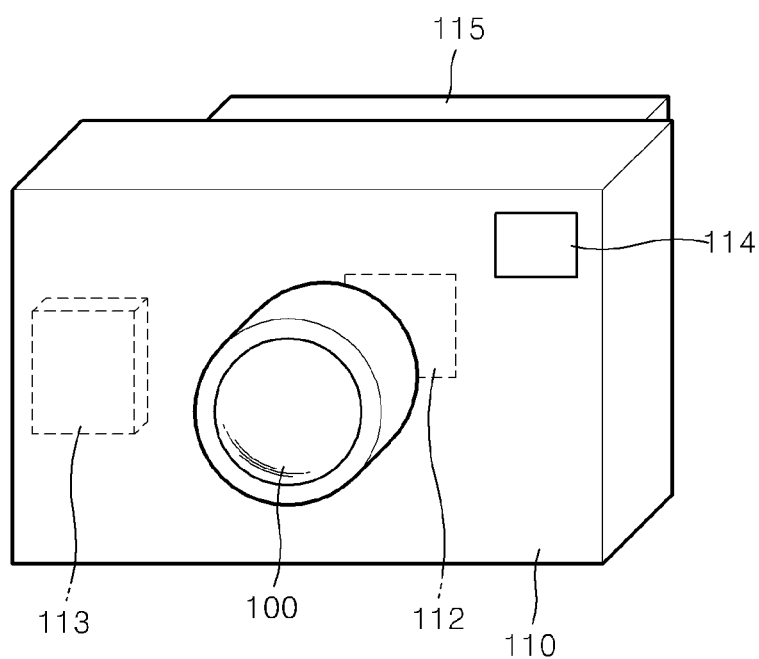
FIG. 25 illustrates a photographing apparatus, according to an embodiment of the invention.

FIG. 25 illustrates a photographing apparatus 110 including a single focus lens system 100, according to an embodiment of the invention. The photographing apparatus 110 includes the single focus lens system 100 according to one of the embodiments described above, and an imaging device 112 for receiving light formed as an image using the single focus lens system 100. The photographing apparatus 110 may include a recording unit 113 for recording information on a subject that is photoelectrically converted by the imaging device 112, and a view finder 114 for observing images of the subject. In addition, the photographing apparatus 110 may include a display unit 115 on which an image of the subject may be displayed. While the view finder 114 and the display unit 115 are separately included, the photographing apparatus 110 is not limited thereto and only a display unit may be included without a view finder. The photographing apparatus 110 illustrated in FIG. 25 is an example, and various optical devices other than cameras may be used as the photographing apparatus 115. As described above, by using the single focus lens system 100 according to the embodiments of the invention in photographing apparatuses such as digital cameras, an optical device having a wide viewing angle, high luminance, and compact size may be implemented.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A single focus lens system comprising a first lens group having a negative refractive power, a stop, and a second lens group having a positive refractive power, sequentially arranged in order from an object side, wherein the first lens group comprises first and second air lenses having a negative refractive power, a meniscus shape and a convex surface toward the object side, and the second lens group comprises a lens that has a positive refractive power, is disposed closest to the object side, and has a convex surface toward the object side, wherein the single focus lens system satisfies the following expressions, $$-10 < F\mathrm{air}1/F < -2.5$$

$$-6 < F\mathrm{air}2/F < -1$$

$$0.6 < Fp2/F < 1.5,$$

where F denotes an overall focal length, Fair1 denotes a focal length of the first air lens of the first lens group, Fair2 denotes a focal length of the second air lens of the first lens group, and Fp2 denotes a focal length of the lens of the second lens group.

2. The single focus lens system of claim 1, wherein the first lens group comprises at least one first lens having a negative refractive power, wherein the at least one first lens satisfies the following expressions, $Ndn1<1.65$ $Vdn1>55$, where Ndn1 denotes a refractive index of the at least one first lens, and Vdn1 denotes an Abbe number of the at least one first lens.

3. The single focus lens system of claim 2, wherein the first lens group comprises a second lens having a positive refractive power, wherein the second lens satisfies the following expression, $Ndp1<1.75$, where Ndp1 denotes a refractive index of the second lens.

4. The single focus lens system of claim 3, wherein the single focus lens system satisfies the following expression, $0.4<Fp1/F<2.0$, wherein F denotes an overall focal length of the single focus lens system, and Fp1 denotes a focal length of the second lens.

5. The single focus lens system of claim 1, wherein the first and second air lenses of the first lens group comprise at least one aspherical surface and satisfy the following expression, $1.5<Haph*F/ID<4.0$, wherein Haph denotes a distance from a point where a ray passing through a center of an aperture among light fluxes, which are formed as an image at the highest image height of a diagonal line of an image plane, meets the aspherical surface to an optical axis, F denotes an overall focal length, and ID denotes a diagonal length of the image plane.

6. The single focus lens system of claim 1, wherein the first lens group satisfies the following expressions, $-0.5<(R1air1-R2air1)/(R1air1+R2air1)<-0.1$ $-1.0<(R1air2-R2air2)/(R1air2+R2air2)<-0.3$, where R1air1 denotes a curvature radius of the first air lens at the object side, R2air1 denotes a curvature radius of the first air lens at an image side, R1air2 denotes a curvature radius of the second air lens at the object side, and R2air2 denotes a curvature radius of the second air lens at the image side.

7. The single focus lens system of claim 1, wherein the single focus lens system satisfies the following expressions, $-8.0<F1/F<-1.0$ $0.8<F2/F<1.4$, wherein F denotes an overall focal length of the single focus lens system, F1 denotes a focal length of the first lens group, and F2 denotes a focal length of the second lens group.

8. The single focus lens system of claim 1, wherein the second lens group further comprises a third lens having a negative refractive power and a fourth lens having a positive refractive power, arranged in order from the lens that is closest to the object side toward an image side.

9. The single focus lens system of claim 8, wherein the fourth lens has a convex, aspherical surface toward the image side.

10. The single focus lens system of claim 1, wherein the lens of the second lens group that is closest to the object side has an aspherical surface.

11. The single focus lens system of claim 1, wherein the second lens group comprises a positive-negative doublet lens or a negative-positive doublet lens disposed closest to an image side.

12. The single focus lens system of claim 1, wherein the first lens group and the second lens group move in parallel along an optical axis to perform focusing.

13. The single focus lens system of claim 1, wherein the first lens group and the second lens group move in parallel with respect to an optical axis with different loci to perform focusing.

14. The single focus lens system of claim 1, wherein the lens of the second lens group closest to the object side performs focusing.

15. The single focus lens system of claim 1, wherein a half-viewing angle of the single focus lens system is in a range from 40 to 45 degrees.

16. The single focus lens system of claim 1, wherein an F-number of the single focus lens system is in a range from 2 to 2.8.

17. A photographing apparatus comprising:
a single focus lens system; and
an imaging device receiving an image formed by the single focus lens system,
wherein the single focus lens system comprises a first lens group having a negative refractive power, a stop, and a second lens group having a positive refractive power, sequentially arranged in order from an object side,
wherein the first lens group comprises first and second air lenses having a negative refractive power, a meniscus shape and a convex surface toward the object side, and the second lens group comprises a lens that has a positive refractive power, is disposed closest to the object side, and has a convex surface toward the object side,
wherein the single focus lens system satisfies the following expression, $-10<Fair1/F<-2.5$ $-6<Fair2/F<-1$ $0.6<Fp2/F<1.5$, where F denotes an overall focal length, Fair1 denotes a focal length of the first air lens of the first lens group, Fair2 denotes a focal length of the second air lens of the first lens group, and Fp2 denotes a focal length of the lens of the second lens group.

18. The photographing apparatus of claim 17, wherein the first lens group comprises at least one first lens having a negative refractive power, wherein the at least one first lens satisfies the following expressions, $Ndn1<1.65$ $Vdn1>55$, where Ndn1 denotes a refractive index of the at least one first lens, and Vdn1 denotes an Abbe number of the at least one first lens.

19. The photographing apparatus of claim 18, wherein the first lens group comprises a second lens having a positive refractive power, wherein the second lens satisfies the following expression, $$Ndp1<1.75,$$

where Ndp1 denotes a refractive index of the second lens.

20. The photographing apparatus of claim 19, wherein the single focus lens system satisfies the following expression, $$0.4<Fp1/F<2.0,$$

wherein F denotes an overall focal length of the single focus lens system, and Fp1 denotes a focal length of the second lens.

21. The photographing apparatus of claim 17, wherein the first and second air lenses of the first lens group comprise at least one aspherical surface and satisfy the following expression, $$1.5<Haph*F/ID<4.0,$$

wherein Haph denotes a distance from a point where a ray passing through a center of an aperture among light fluxes, which are formed as an image at the highest image height of a diagonal line of an image plane, meets the aspherical surface to an optical axis, F denotes an overall focal length, and ID denotes a diagonal length of the image plane.

* * * * *